United States Patent
Burney et al.

(10) Patent No.: US 7,343,388 B1
(45) Date of Patent: Mar. 11, 2008

(54) IMPLEMENTING CROSSBARS AND BARREL SHIFTERS USING MULTIPLIER-ACCUMULATOR BLOCKS

(75) Inventors: Ali H Burney, Fremont, CA (US); Guy R Schlacter, Buffalo, IL (US)

(73) Assignee: Altera Corporation, San Jose, CA (US)

( * ) Notice: Subject to any disclaimer, the term of this patent is extended or adjusted under 35 U.S.C. 154(b) by 579 days.

(21) Appl. No.: 10/383,304

(22) Filed: Mar. 5, 2003

(51) Int. Cl.
*G06F 15/00* (2006.01)

(52) U.S. Cl. .................................... 708/209

(58) Field of Classification Search ......... 708/200–211
See application file for complete search history.

(56) References Cited

U.S. PATENT DOCUMENTS

| | | | |
|---|---|---|---|
| 4,887,232 A * | 12/1989 | Wolrich et al. ............. 708/209 |
| 4,999,796 A * | 3/1991 | DeWitt et al. ............. 708/209 |
| 5,442,576 A * | 8/1995 | Gergen et al. ............. 708/209 |
| 6,060,903 A | 5/2000 | Rangasayee et al. |
| 6,343,337 B1 * | 1/2002 | Dubey et al. ............. 708/209 |
| 6,404,225 B1 | 6/2002 | Rangasayee |
| 6,538,470 B1 | 3/2003 | Langhammer et al. |
| 6,922,716 B2 * | 7/2005 | Desai et al. ................ 708/524 |
| 2003/0141898 A1 | 7/2003 | Langhammer et al. |

* cited by examiner

*Primary Examiner*—Chat C. Do
(74) *Attorney, Agent, or Firm*—Ropes & Gray LLP

(57) ABSTRACT

An interface receiver, which is part of an interface that allows the transfer of data between two incompatible I/O standards, includes a crossbar and a barrel shifter that can be implemented using multiplier-accumulator blocks. The crossbar reorders an incoming burst of data and writes the data into a larger data column where the data is barrel-shifted using multiplier-accumulator blocks and transferred out of the receiver when an end-of-packet is detected or the shifted data column as seen from outside the interface receiver is full.

28 Claims, 21 Drawing Sheets

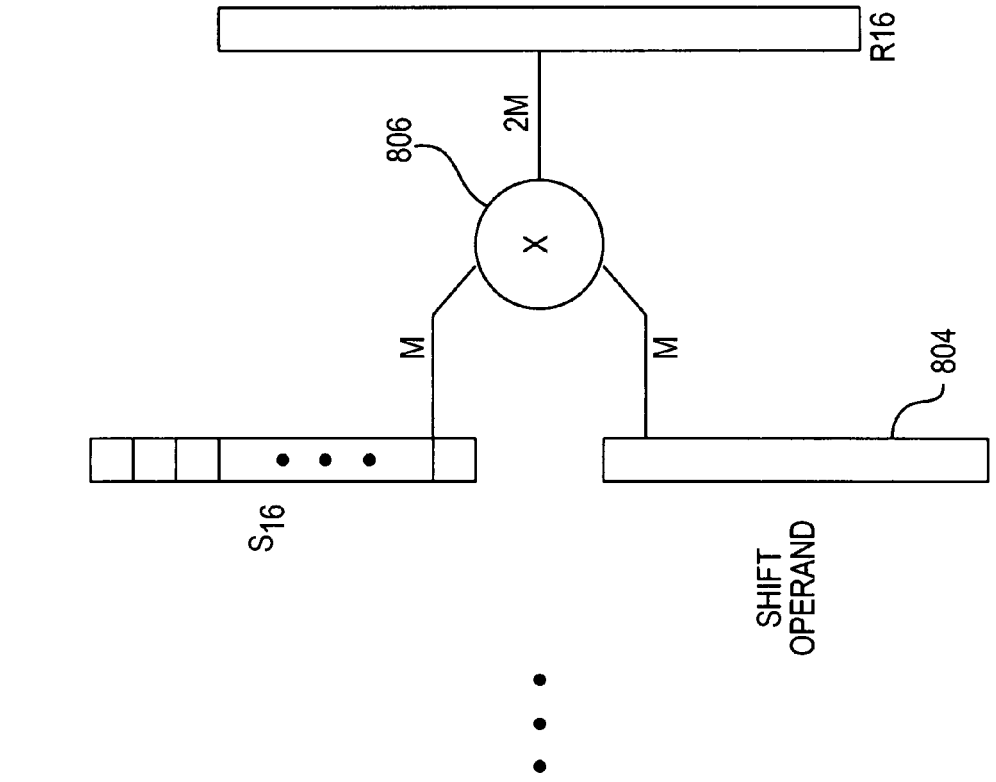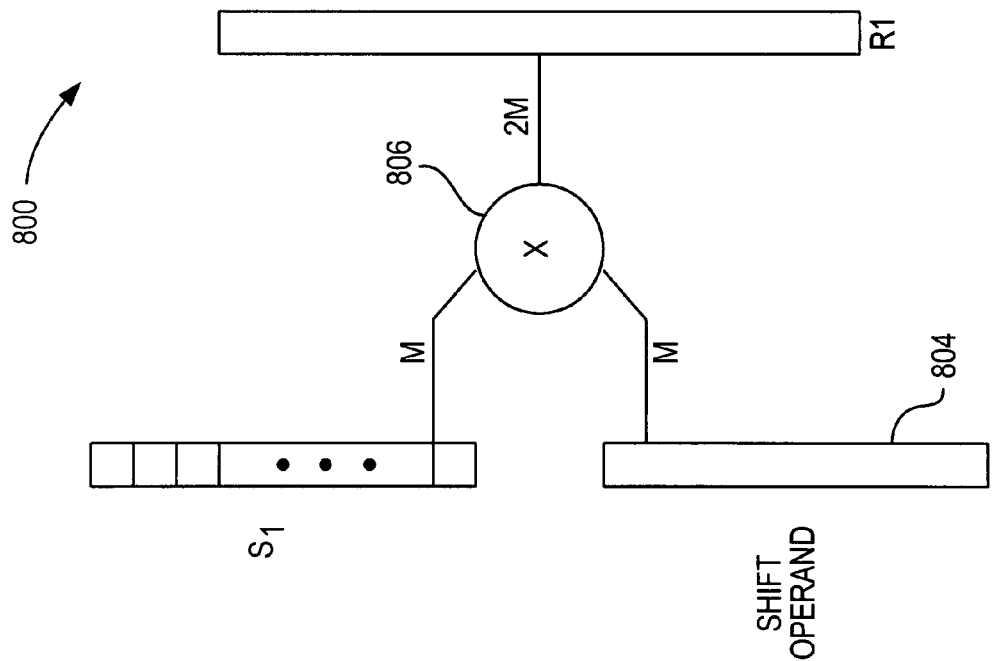
FIG. 8

US 7,343,388 B1

IMPLEMENTING CROSSBARS AND BARREL SHIFTERS USING MULTIPLIER-ACCUMULATOR BLOCKS

BACKGROUND OF THE INVENTION

This invention relates to interfaces in programmable logic devices. More particularly, this invention relates to interfaces in programmable logic devices that interface different input/output (I/O) standards.

A programmable logic device ("PLD") is a general-purpose integrated circuit device that is programmable to perform any of a wide range of logic tasks. Rather than having to design and build separate logic circuits for performing different logic tasks, general-purpose PLDs can be programmed in various different ways to perform those various logic tasks. Many manufacturers of electronic circuitry and systems find PLDs to be an advantageous way to provide various components of what they need to produce.

There are numerous high-speed input/output (I/O) industry standards that are available for transferring data between two locations within a PLD. Such I/O standards include, for example, Synchronous Optical NETwork (SONET), 10 Gigabyte (10 G) Ethernet, InfiniBand, Packet Over Sonet—Physical Layer 4 (POS-PHY4), Rapid I/O, Utopia, Hyper-Transport, FlexBus, etc. These I/O standards are typically incompatible with one another, thus preventing the direct transfer of data from one I/O standard to another. For example, the 10G Ethernet I/O standard can send or receive a burst of data containing four words (where each word is sixteen bits) each clock cycle. The POS-PHY4 I/O standard, on the other hand, can send or receive a burst of data containing eight words each clock cycle. The use of an interface allows the transfer of data from one I/O standard to another.

An interface generally includes a receiver and a transmitter. In particular, an interface receiver typically includes a crossbar and a barrel shifter. A crossbar receives a burst of data from an I/O standard and reorders this data. A barrel shifter then shifts this data for transfer out to another I/O standard. Crossbars and barrel shifters are generally implemented using a large number of logic elements (e.g., in the thousands). As a result, an interface receiver occupies a large area and is costly to implement.

It would therefore be desirable to implement crossbars and barrel shifters in an interface more efficiently, thereby minimizing the area overhead and cost.

SUMMARY OF THE INVENTION

In accordance with the invention, crossbars and barrel shifters in an interface receiver can be implemented using multiplier-accumulator (MAC) blocks. A crossbar reorders an incoming burst of data. The reordered data is then written into a larger data column where the data is barrel-shifted using MAC blocks. The barrel-shifted data is then sent to a buffer column where the data is transferred out of the receiver when an end-of-packet is detected or when the buffer column is full.

In implementing a barrel shifter, data in the larger data column is divided into one or more sub-columns. Each sub-column is then sliced into bit columns where each bit column is sent into a MAC block. A MAC block can include at least one multiplier whose inputs are a bit column and a shift operand. The output of the multiplier generates a shifted bit column. Each of the shifted bit columns for a given sub-column can be combined and multiplexers can be used to write data from the shifted sub-columns and the reordered data in a next cycle back into the larger data column. The invention allows both uni-directional barrel shifting and rotational barrel shifting to be implemented. Data is sent to a buffer column for transfer out of the interface receiver when an end-of-packet is detected or when the buffer column is full.

In using MAC blocks, the invention makes use of existing circuitry in an interface receiver, thereby reducing the number of logic elements needed to implement the crossbar and barrel shifter. The number of MAC blocks needed to implement the barrel shifter can further be reduced by employing time-domain multiplexing, which uses a faster clock to barrel-shift the data over multiple cycles.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 8 illustrates an implementation of a barrel shifter on the bit columns in FIG. 7 in accordance with one embodiment of the invention;

DETAILED DESCRIPTION OF THE INVENTION

Figure 1:
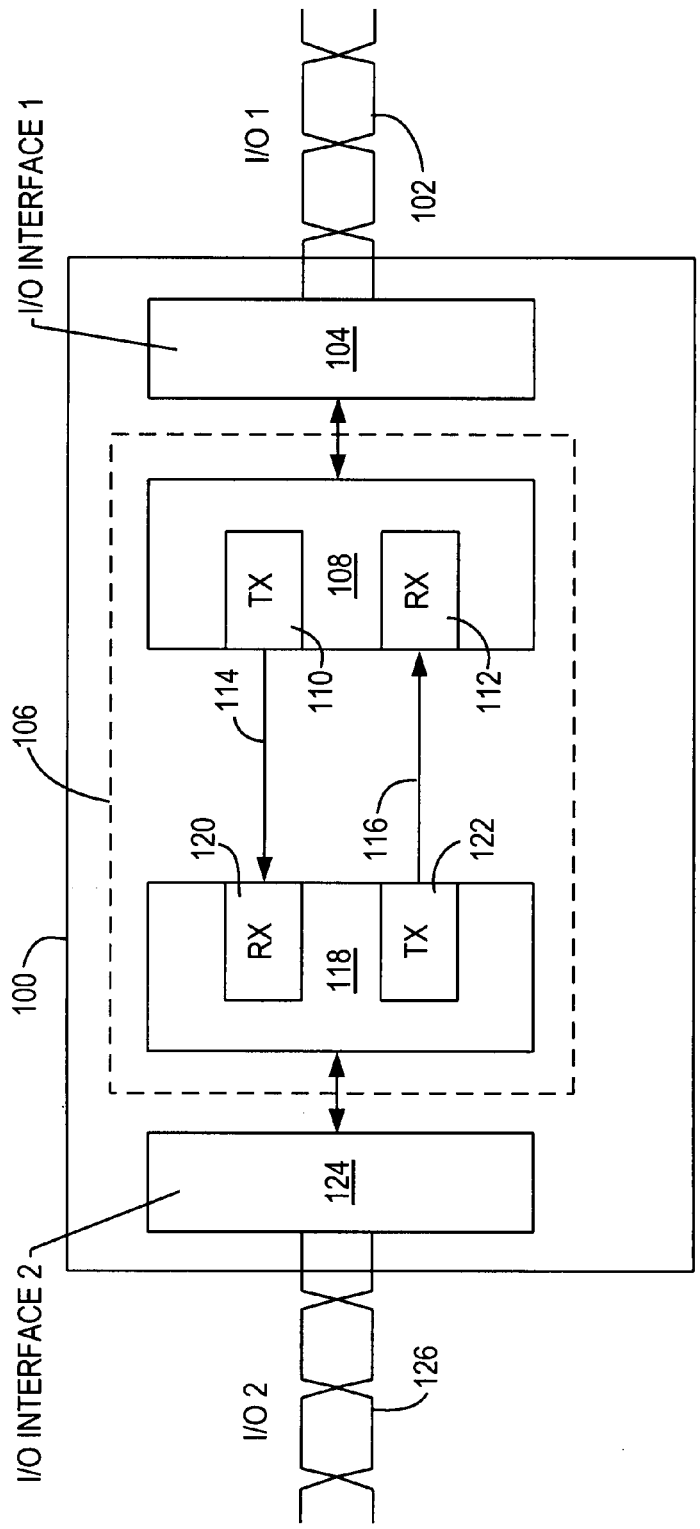
FIG. 1 illustrates an interface in accordance with one embodiment of the invention.

FIG. 1 is a block diagram of an interface in a programmable logic device (PLD) 100. Although the invention is described primarily in the context of an interface that interfaces two input/output (I/O) standards on a PLD for specificity and clarity, the invention can be implemented in any suitable way. For example, an interface can include any suitable device, circuit, or medium, for interfacing any suitable standards or for transferring any suitable data, on any suitable device or combination of devices. For an interface that interfaces two I/O standards, in one embodiment, data 102 in a first I/O standard can be sent in a second I/O standard via a first I/O interface 104, interface bridge 106, and a second I/O interface 124. Similarly, data 126 in a second I/O standard can be sent in a first I/O standard via a second I/O interface 124, interface bridge 106, and a first I/O interface 104. I/O interfaces 104 and 124 can process data from a corresponding I/O standard into a form suitable for transmission to interface bridge 106. I/O interfaces 104 and 124 can also receive data from interface bridge 106 and process the data into a form suitable for transmission in a corresponding I/O standard.

Interface bridge 106 can be any suitable device that allows the transfer of data between two incompatible I/O standards. Interface bridge 106 includes two modules 108 and 118. Module 108 is associated with a first I/O interface 104 while module 118 is associated with a second I/O interface 124. Each module 108 and 118 includes a transmitter 110 and 122 and a receiver 112 and 120, respectively. In one embodiment, transmitter 110 in module 108 sends data to receiver 120 in module 118 via a communications path 114. Similarly, transmitter 122 in module 118 sends data to receiver 112 in module 108 via a communications path 116. Communications paths 114 and 116 can be any suitable path for transmitting data, including a serial data bus, a parallel data bus, or a combination of the same. Communications paths 114 and 116 can be separate paths or combined into one path.

Figure 18:
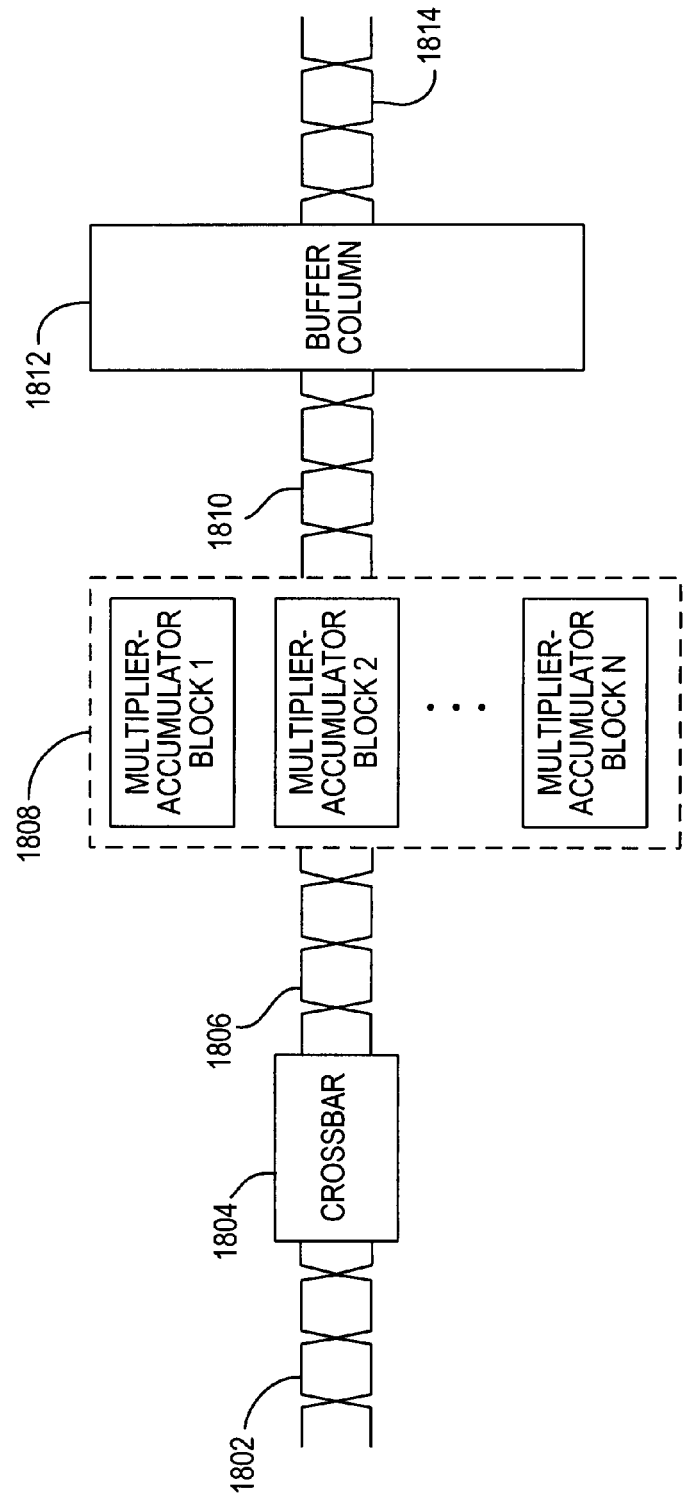
FIG. 18 illustrates a crossbar and multiplier-accumulator blocks according to one embodiment of the invention.

In accordance with the invention, interface receivers 112 and 120 include a crossbar and a barrel shifter. Referring to FIG. 18, crossbar 1804 reorders incoming burst of data 1802. Reordered data 1806 is then written into a larger data column where the data is barrel-shifted using multiplier-accumulator (MAC) blocks 1808. Data 1810 in the shifted data column is transferred to buffer column 1812 and out of the interface receiver as output 1814 when an end-of-packet is detected or when buffer column 1812 is full. The use of MAC blocks is more efficient than conventional approaches to barrel shifting. The number of logic elements needed to implement the interface receiver is significantly reduced.

A burst of data can be sent each clock cycle over an I/O standard. Each burst of data is generally a fixed number of words for a given I/O standard. When a burst of data is received, the data can be arranged in a data column one-word (i.e., sixteen bits) wide. While data is primarily described herein in the context of data being arranged in data columns one-word wide for specificity and clarity, data can be arranged in any suitable arrangement (e.g., in a data column multiple words wide, in a data row one-word deep or multiple words deep).

Figure 2:
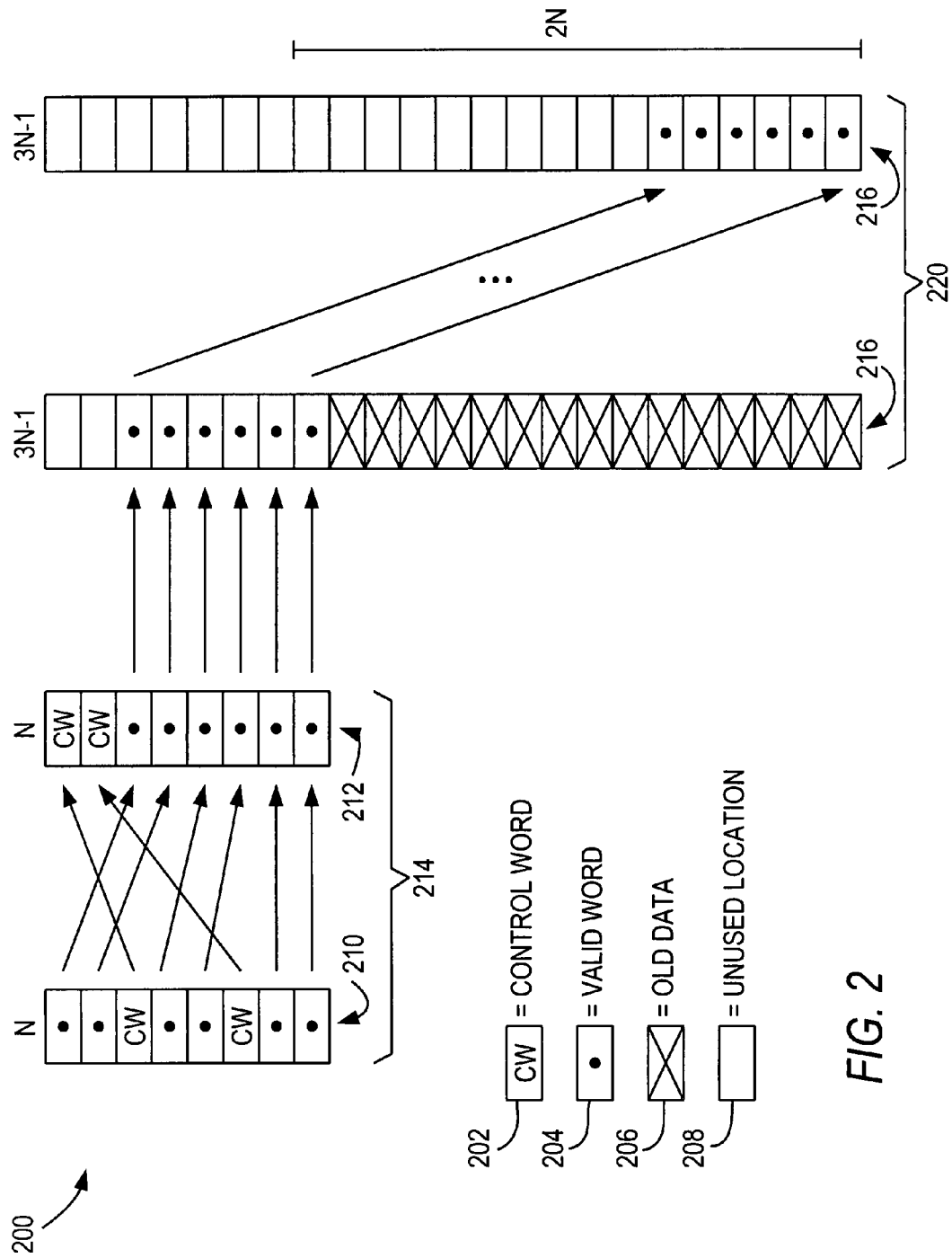
FIG. 2 illustrates an implementation of a crossbar and a barrel shifter.

FIG. 2 illustrates an N×N crossbar 214 and a uni-directional barrel shifter 220. N represents a number of words in a burst of data sent over a given I/O standard. For example, for data from the Packet Over Sonet—Physical Layer 4 (POS-PHY4) I/O standard, an 8×8 (N=8) crossbar can be implemented. For data coming from the 10 Gigabyte (10 G) Ethernet standard, a 4×4 (N=4) crossbar can be implemented. A burst of data can be arranged in a data column 210 one-word wide and N-bits deep. The size of column 210 can vary depending on the I/O standard, but is primarily described herein in the context of an 8-bit deep column for specificity and clarity.

A burst of data arranged in column 210 can include a complete data packet, multiple data packets, a partial data packet, or any combination of the same. Each data packet, which includes multiple valid words (designated by "●") 204, begins with a start-of-packet (SOP) and ends with an end-of-packet (EOP). One or more control words (designated by "CW") 202 is typically associated with each data packet and can include address information, a flag that signals when a new data packet is present, error information, or any other suitable information. Control words 202 are not part of the valid words 204 in a data packet, but provide a way to transfer a particular data packet to a particular destination. Once a data packet reaches the destination, the control words associated with that data packet are no longer needed and are therefore removed.

Crossbar 214 can separate the control words 202 from the valid words 204 and can reorder the valid words 204. The valid words 204 can be reordered based on any suitable factor, including the size or priority of the data. For example, words with higher priority can be moved ahead of words with lower priority. In crossbar 214, each word in column 210 can be sent to any one of the word locations in column 212. The two control words 202 have been grouped together and sent to the top of column 212, with the remaining valid words 204 below the control words 202.

Next, data from column 212 can be written to a larger data column 216 one-word wide and (3N−1) bits deep. Valid words 204 from column 212 can be written to corresponding word locations in column 216. Control words 202 in column 212 are no longer needed and so are not written to column 216, leaving unused locations 208 at the corresponding word locations in column 216. The rest of column 216 can include old data 206 from prior bursts of data from previous clock cycles.

Once the valid words 204 have been written to column 216, the data can be barrel-shifted by any suitable number of bits (e.g., 0, 1, . . . , N, . . . ). In FIG. 2, data in column 216 has been shifted by fifteen bits (i.e., 15 word locations) so that the valid words 204 are at the bottom of column 216.

The invention is described primarily in the context of control words 202 being sent through a crossbar to the top of data column 212, with the reordered data written to the top of a larger data column 216 and barrel-shifted down data column 216 for specificity and clarity. However, any other suitable approach for sending data through a crossbar, writing data to data columns, and barrel-shifting data can be implemented. For example, control words can be sent through a crossbar to the top, bottom, or any other suitable location in column 212. Data from column 212 can then be written to the top, bottom, or any other suitable location in the larger data column 216. Depending on the location of the data in the larger data column 216, the data may be barrel-shifted up or down. As another example, data may be arranged in a data row with the data being oriented to the right, left, or any other suitable location.

Figure 3:
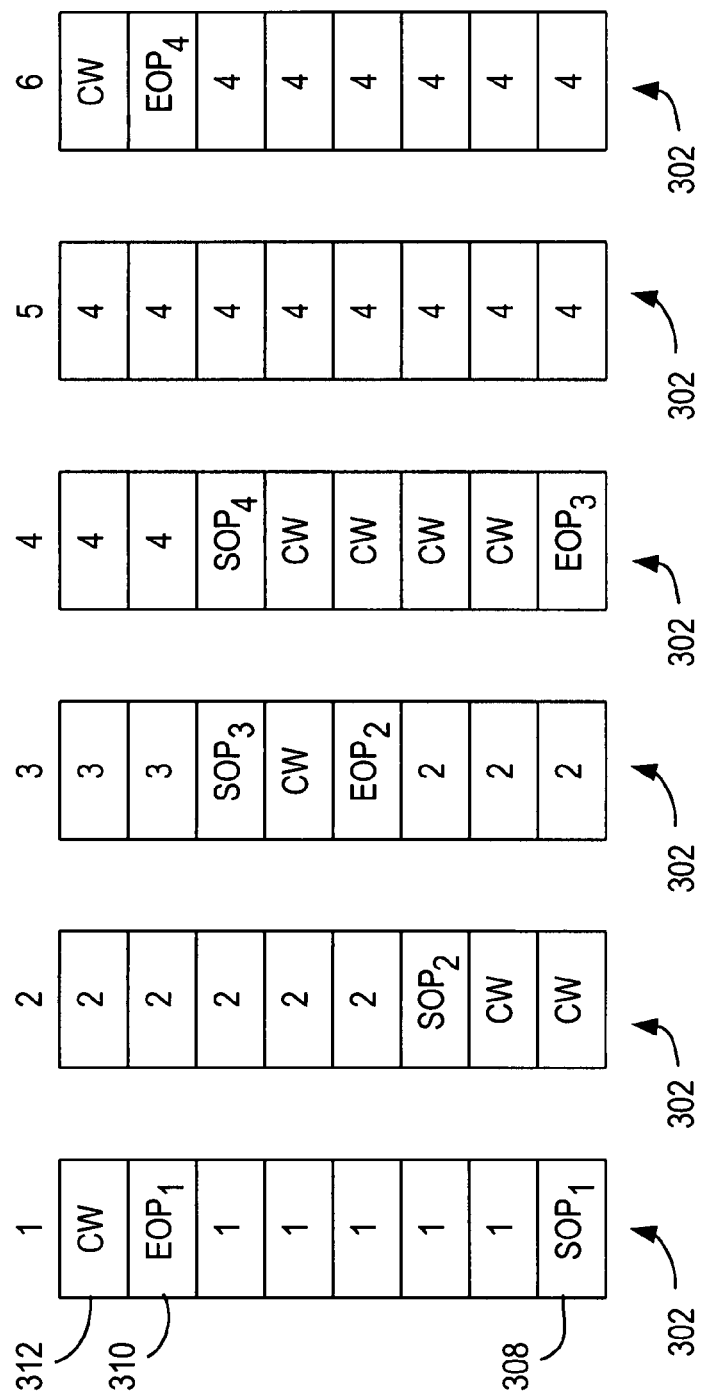
FIGS. 3-6 illustrate multiple bursts of data being sent through a crossbar and barrel shifter in accordance with one embodiment of the invention.

FIGS. 3-6 illustrate multiple bursts of data being sent through an 8×8 crossbar and a uni-directional barrel shifter. Each burst of data is primarily described herein as having eight data words for specificity and clarity, although the invention applies to bursts of data having a different number of words. As shown in FIG. 3, an interface receiver 112 or 120 receives a burst of data 302 containing eight (N=8) words in each clock cycle (e.g., cycles 1-6). A start-of-packet (SOP) 308 signals the beginning of a packet while an end-of-packet (EOP) 310 signals the end of a packet. Typically, one or more control words (CW) 312 precede each SOP 308. Packets of data can be sent over one burst or over multiple bursts of data. For example, a first packet (designated by "SOP$_1$," "1," and "EOP$_1$") is sent over one burst of data (e.g., cycle 1), and a second packet (designated by "SOP$_2$," "2," and "EOP$_2$") is sent over two bursts of data (e.g., cycles 2 and 3).

Figure 4:
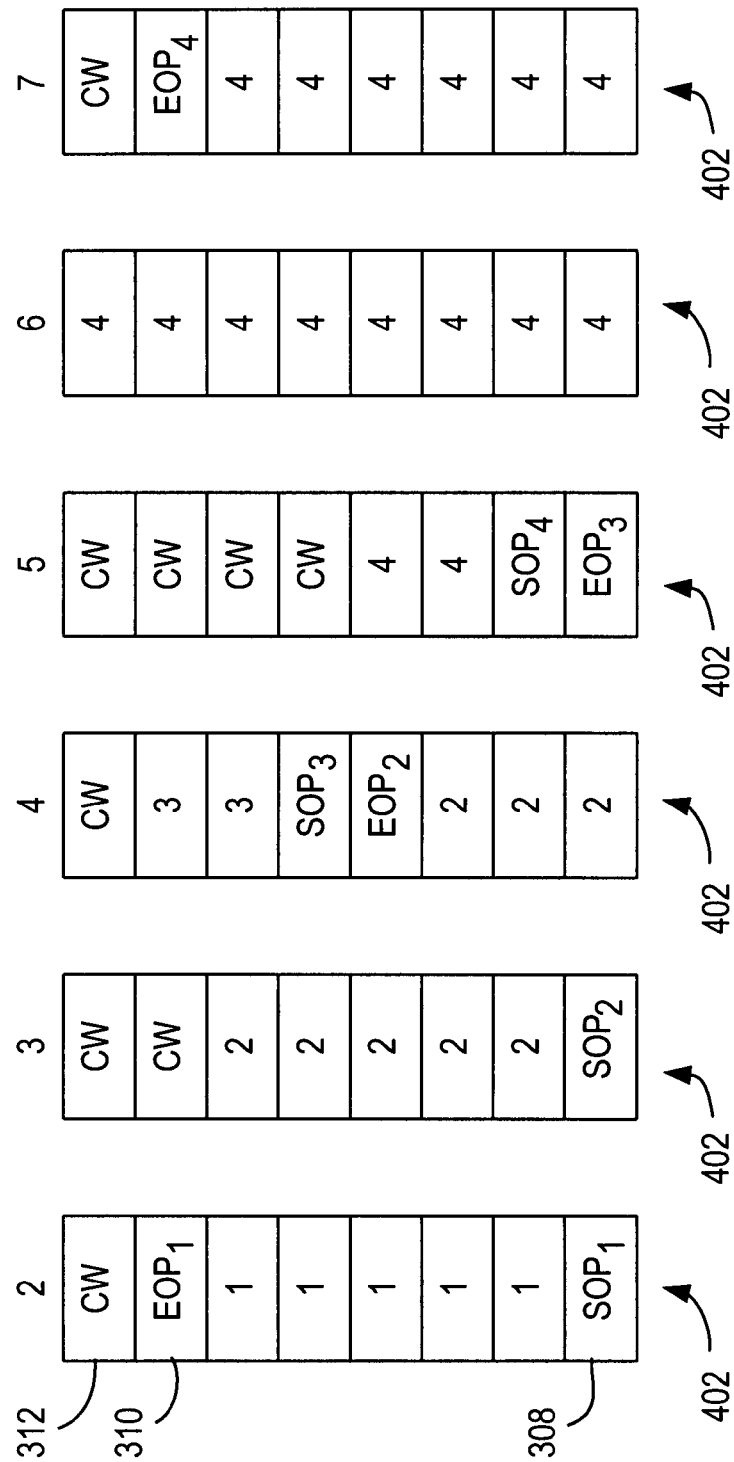

As shown in FIG. 4, each burst of data 302 is sent through an 8×8 crossbar in subsequent clock cycles 2-7 into a data column 402. For example, a first burst of data 302 received in a first clock cycle is sent through a crossbar to data column 402 in a second clock cycle. Also in the second clock cycle, the interface receiver receives a next burst of data 302.

Figure 5:
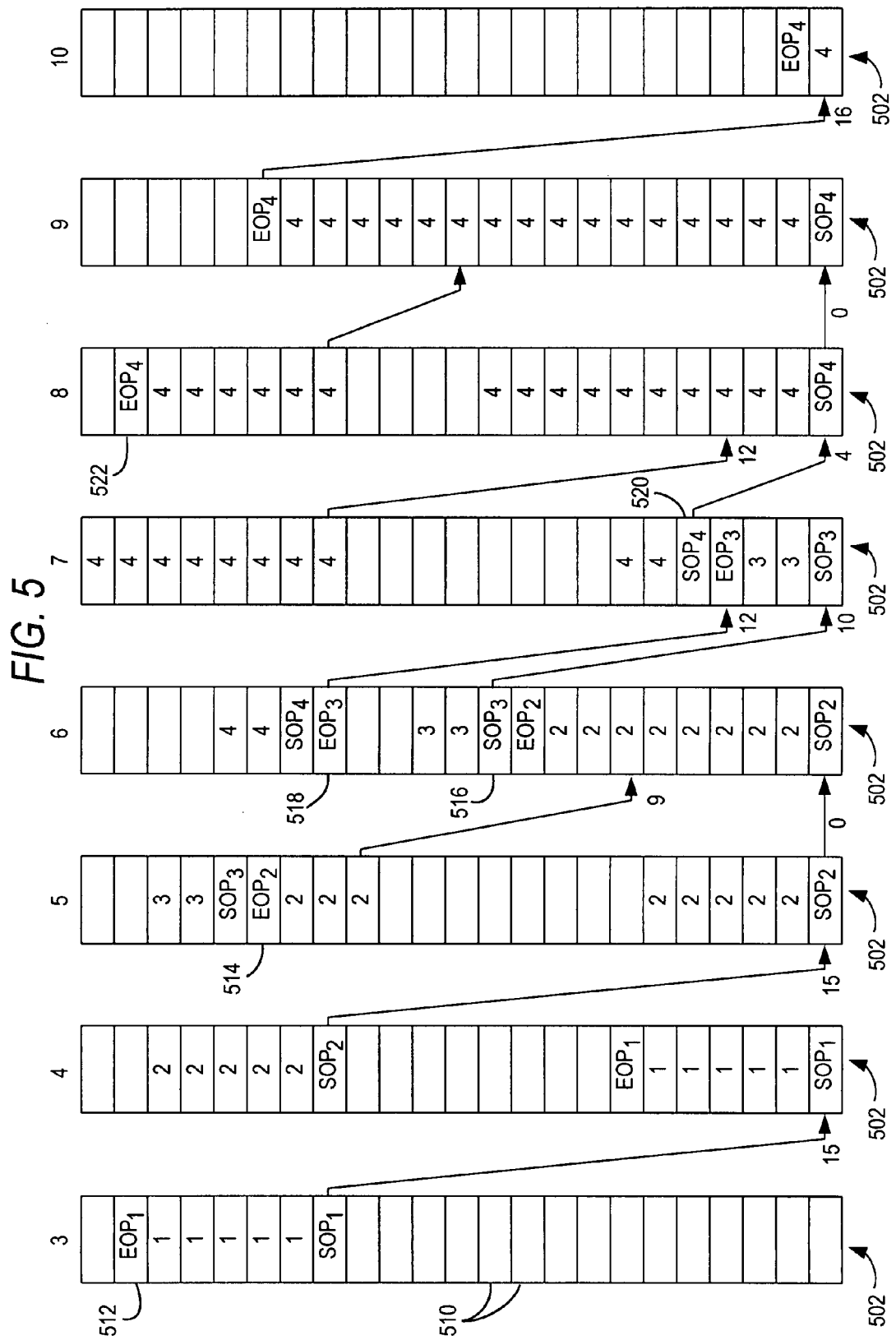

As shown in FIG. 5, data being sent to data column 402 in clock cycles 2-7 can be written into data column 502 and then barrel-shifted in subsequent clock cycles 3-10. For a burst of data containing eight (N=8) words, column 502 is twenty-three (3N−1=23) bits deep.

Figure 6:
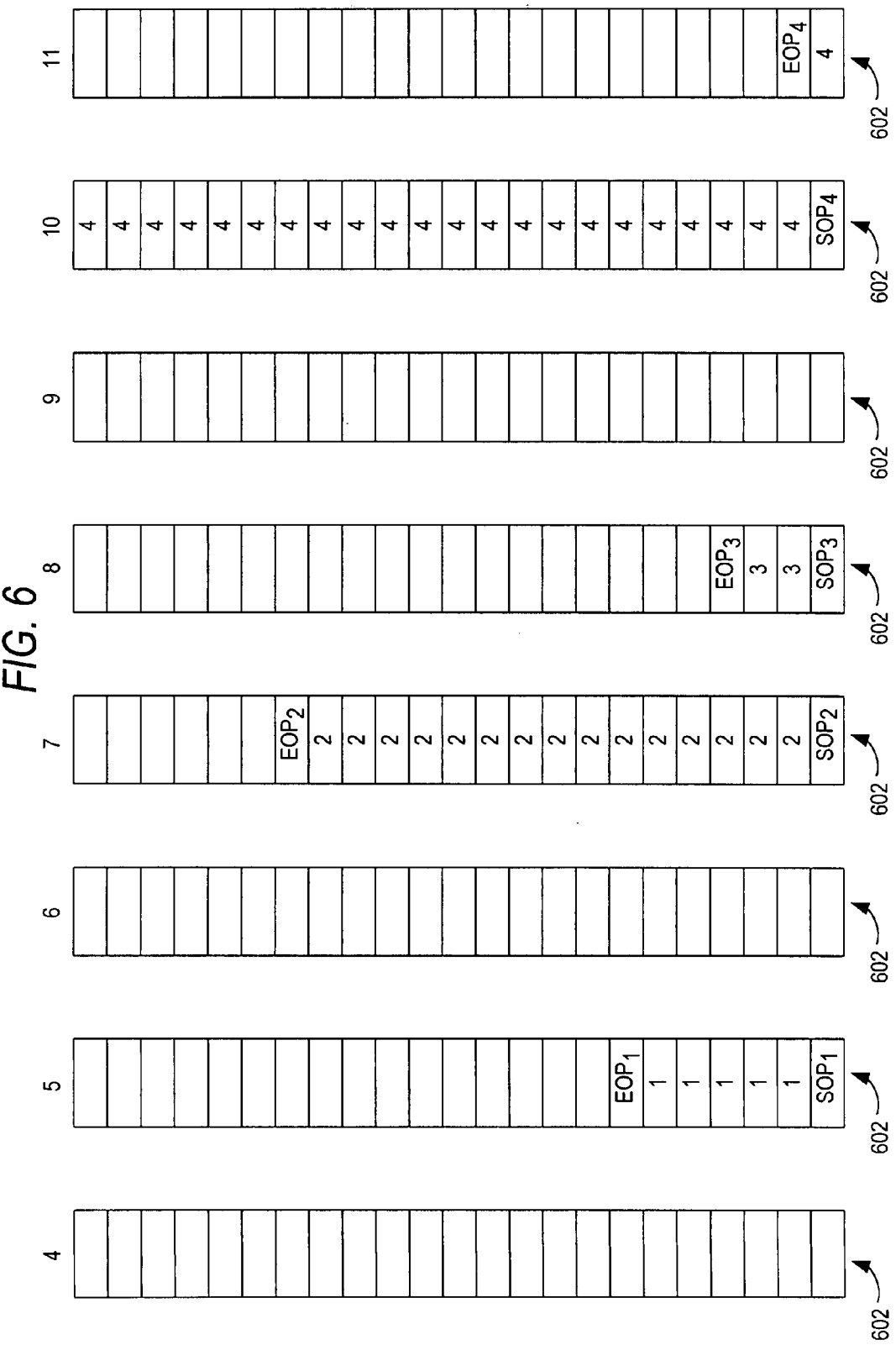

There are generally two conditions in which data is transferred out of an interface receiver. One condition occurs when an EOP 310 is detected within a predetermined number (e.g., 2N) of word locations in column 502 (e.g., a bottom sixteen word locations). When this condition is met, all valid words within this predetermined number of word locations can be transferred to a buffer region 602 as shown in FIG. 6 for transfer out of the interface receiver. Another condition occurs when the predetermined number of word locations in column 502 is filled with valid words. Data within the predetermined number of word locations can be transferred to buffer region 602 for transfer out of the interface receiver. The buffer region can be designed to include this predetermined number of word locations or any other suitable number of word locations less than the size of data column 502 in order to minimize the possibility of an overrun error or other error.

In cycle 3, data (e.g., from column 402 in cycle 2) written to the top of column 502 can be barrel-shifted by fifteen word locations to the bottom of column 502 in cycle 4. Because an EOP$_1$ 512 is detected, the data is transferred to buffer column 602 in cycle 5 before being read of the interface receiver.

In cycle 4, data (e.g., from column 402 in cycle 3) written to the top of column 502 can be barrel-shifted by fifteen word locations to the bottom of column 502 in cycle 5. Because neither of the two conditions for transferring out data has been met (e.g., an EOP$_2$ 514 has not been detected and the bottom sixteen word locations are not full), no data is transferred to buffer column 602 in cycle 6. Buffer column 602 may be cleared or any other suitable approach may be used to indicate that no data will be read out of the interface receiver.

In cycle 5, data (e.g., from column 402 in cycle 4) written to the top of column 502 can be barrel-shifted by nine word locations in cycle 6 so that the data is one word location above the previous data (i.e., there are no unused locations 510 between the two sets of data). EOP$_2$ 514 is present so the data from packet 2 is transferred to buffer column 602 in cycle 7.

In cycle 6, the remaining data not transferred out (e.g., part of packet 3 beginning with SOP$_3$ 516) can be barrel-shifted by ten word locations to the bottom of column 502 in cycle 7. Also in cycle 6, data (e.g., from column 402 in cycle 5) written to the top of column 502 can be barrel-shifted by twelve word locations in cycle 7 so that there are no unused locations 510 between the two sets of data. An EOP$_3$ 518 is present so the data from packet 3 is transferred to buffer column 602 in cycle 8.

In cycle 7, the remaining data not transferred out (e.g., part of packet 4 beginning with SOP$_4$ 520) can be barrel-shifted by four word locations to the bottom of column 502 in cycle 8. Also in cycle 7, data (e.g., from column 402 in cycle 6) written to the top of column 502 can be barrel-shifted by twelve word locations in cycle 8 so that there are no unused locations 510 between the two sets of data. Neither of the two conditions for transferring out data has been met so no data is transferred to buffer column 602 in cycle 9.

In cycle 8, data (e.g., from column 402 in cycle 7) written to the top of column 502 can be barrel-shifted by four word locations in cycle 9 so that the data is one word location above the previous data. The bottom sixteen word locations in column 502 are filled so the data from packet 4 in the bottom sixteen word locations is transferred to buffer column 602 in cycle 10.

In cycle 9, the remaining data not transferred out (e.g., part of packet 4) can be barrel-shifted by sixteen word locations to the bottom of column 502 in cycle 10. An EOP$_4$ 522 is present so the remaining data from packet 4 is transferred to buffer column 602 in cycle 11.

Figure 7:
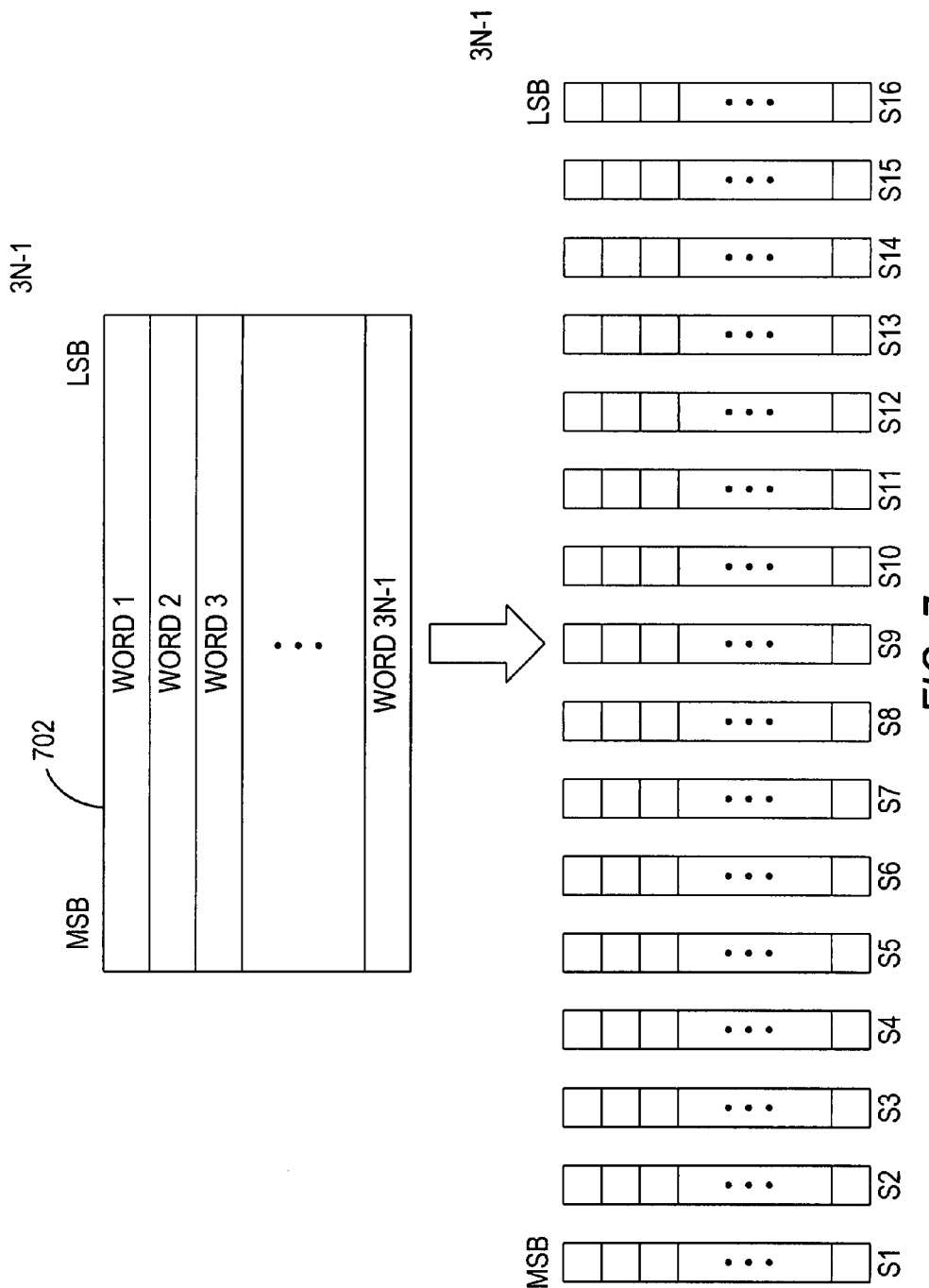
FIG. 7 illustrates the slicing of data into bit columns in accordance with one embodiment of the invention.

Data in column 502 can be barrel-shifted using a multiplier. First, column 502 can be sliced into bit columns as illustrated in FIG. 7. Data column 702 (e.g., data column 502) can be divided into bit-wide data columns (e.g., S1, S2, . . . , S16) such that the bits in the same bit locations for each word (e.g., words 1-(3N−1)) are in the same bit column (e.g., S1-S16). For example, bit column S1 can include the most significant bit (MSB) of each word in column 702 and bit column S16 can include the least significant bit (LSB) of each word in column 702.

Next, the data in bit columns S1-S16 is barrel-shifted using a multiplier. To shift data by one bit is the same as multiplying by two (i.e., $2^1$ or binary 10 or "b10"), to shift by two bits is the same as multiplying by four (i.e., $2^2$ or "b100"), to shift by three bits is the same as multiplying by eight (i.e., $2^3$ or "b100"), etc. In one suitable embodiment, the multiplier may be part of a multiplier-accumulator (MAC) block, which may be part of existing circuitry in the interface receiver. A MAC block can be part of, for example, a digital signal processing region, which is illustratively described in U.S. patent application Ser. No. 09/955,645, entitled "DEVICES AND METHODS WITH PROGRAMMABLE LOGIC AND DIGITAL SIGNAL PROCESSING REGIONS," filed on Sep. 18, 2001, which is hereby incorporated herein in its entirety. In one embodiment, a MAC block includes at least one multiplier whose output is connected to an accumulator. This accumulator, which can be an adder, can sum the output of the multiplier with a prior result (e.g., keeps a running tally of multiplied data). Data can be sent into the multiplier with the output of the multiplier bypassing the accumulator, or any other suitable approach.

There are typically three different modes of operation in a MAC block. One type of MAC block can include a 36×36 multiplier (where each input can be up to 36 bits), which can output a maximum of 72 bits. A second type of MAC block can include four 18×18 multipliers (where each input can be up to 18 bits), with each multiplier able to output a maximum of 36 bits. A third type of MAC block can include eight 9×9 multipliers (where each input can be up to 9 bits), with each multiplier able to output a maximum of 18 bits. While a burst of data typically includes a multiple number of bytes (i.e., 8 bits) of data, an additional bit may be associated with each byte of data for error detection or may be programmable as part of the data.

FIG. 8 is a diagram 800 illustrating the data in bit columns S1-S16 being barrel-shifted using a multiplier. In one embodiment, each bit column S1-S16 can be sent to a different multiplier and processed in one cycle. In another suitable embodiment, more than one bit column can share a multiplier, with each multiplier processing the data over multiple cycles. Depending on the size of each multiplier (e.g., 9×9, 18×18, 36×36), part or all of bit columns S1-S16 can be sent in as input to each multiplier. For example, for the POS-PHY4 I/O standard, where data column 502 is twenty-three words deep, all the data in column 502 can be operated on for the 36×36 (M=36) multipliers, and only part of the data in column 502 can be operated on for the 18×18 (M=18) and 9×9 (M=9) multipliers. In these latter cases, more than one multiplier is needed to shift all the data in each bit column 502.

Figure 9:
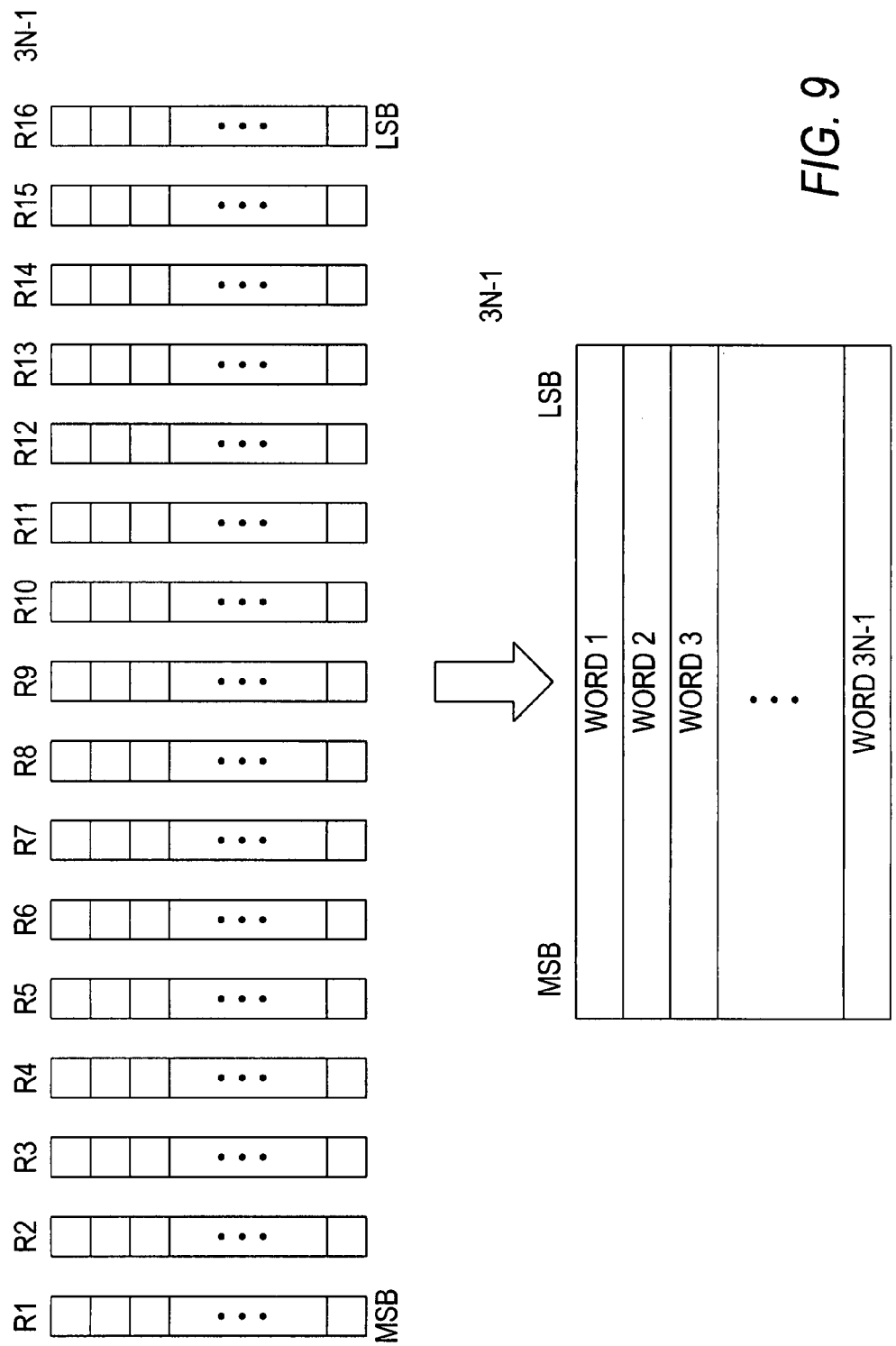
FIG. 9 illustrates the combining of the barrel-shifted bit columns in FIG. 8 in accordance with one embodiment of the invention.

Shift operand 804 indicates how many bit locations the data in bit columns S1-S16 will be shifted. Each bit column S1-S16 is multiplied by the same shift operand 804 to produce shifted bit columns R1-R16, respectively. While the maximum number of outputs for the multiply operation is twice (2M) the number of input bits (e.g., 72 bits for the 36×36 multiplier, 36 bits for the 18×18 multiplier, and 18 bits for the 9×9 multiplier), only a part of the resulting bit columns R1-R16 can be used to form the actual shifted data. This can include corresponding word locations in data column 502. Data in shifted bitcolumns R1-R16 can be combined to form the barrel-shifted data column (e.g., column 502) as illustrated in FIG. 9.

Figure 10:
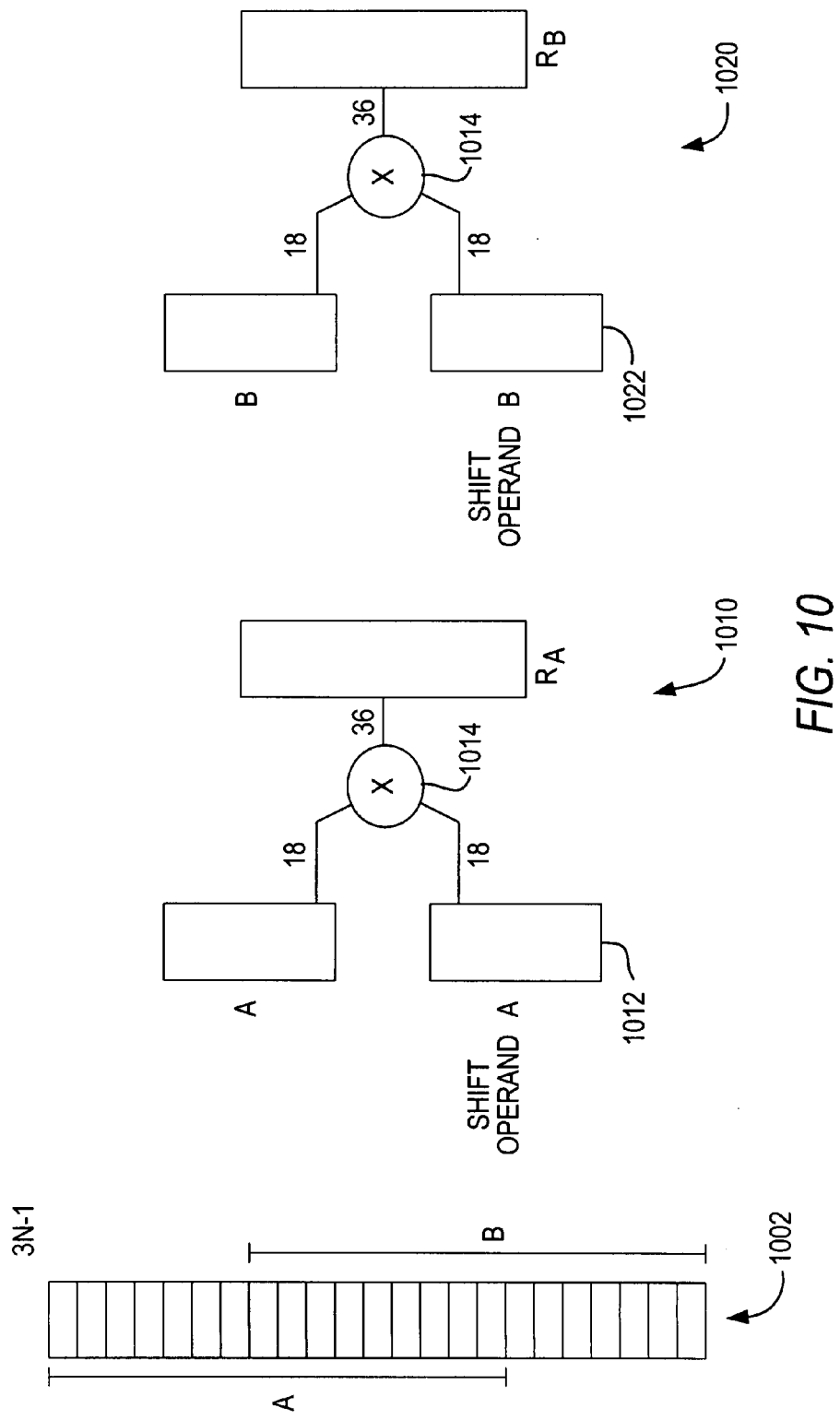
FIGS. 10-11 illustrate an implementation of a barrel shifter on the bit columns in FIG. 7 in accordance with one embodiment of the invention.
Figure 11:
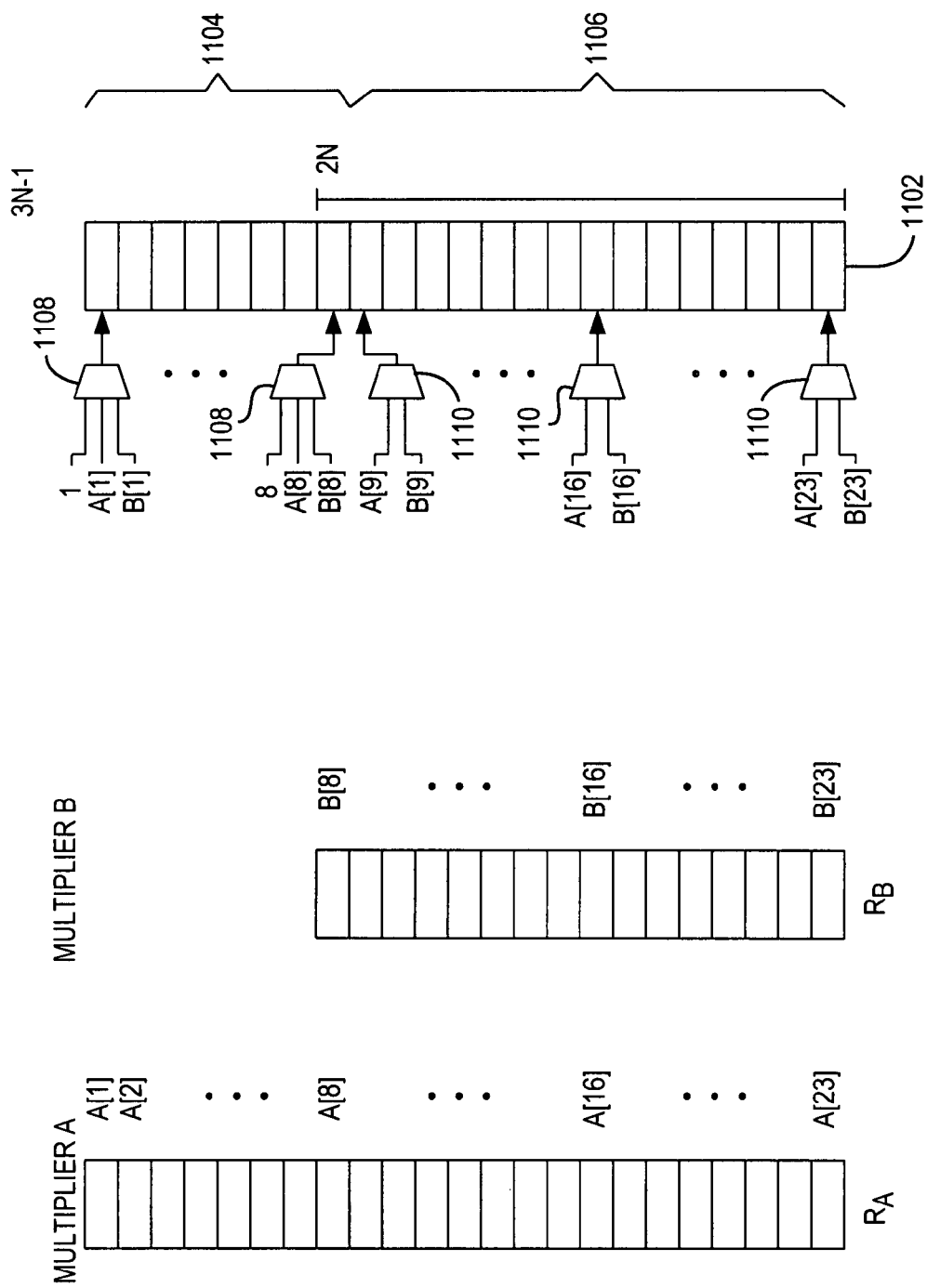

FIGS. 10-11 illustrate an implementation of an 18×18 (M=18) multiplier in accordance with one embodiment of the invention. In FIG. 10, data column 1002 (e.g., column 502) is (3N−1) (e.g., 23) bits deep and sixteen bits wide. Column 1002 can be divided into two sub-columns: sub-column A can include a first group of words and sub-column B can include a second group of words. Sub-column A can include, for example, a first predetermined number of words (e.g., up to eighteen words) located in the top of column 1002, at the bottom of column 1002, or from any suitable location in column 1002. Sub-column B can include, for example, a second predetermined number of words located in the top of column 1002, at the bottom of column 1002, or from any suitable location in column 1002. Each word in column 1002 should be included in at least one of sub-column A or B. Although sub-column A and B may be arranged in any suitable way, sub-column A is primarily described herein as including an upper sixteen word locations in column 1002 and sub-column B is primarily described herein as including a lower sixteen word locations in column 1002 for specificity and clarity. In reference 1010, sub-column A and a first shift operand 1012 are sent to a multiplier 1014 to produce a shifted column $R_A$. In reference 1020, sub-column B and a second shift operand 1022 are sent to a multiplier 1024 to produce shifted column $R_B$. References 1010 and 1020 show a representation of the multiply operation as a collective unit. Note, however, that as shown and described in connection with FIGS. 7-9, each sub-column A and B is divided into individual bit columns, which are each multiplied by their respective shift operand and then combined to form shifted sub-columns $R_A$ and $R_B$, respectively. Shift operand 1012 is the same for each bit column in sub-column A while shift operand 1022 is the same for each bit column in sub-column B. Shift operands 1012 and 1022 may be the same although they are generally different from one another.

Once sub-columns A and B have been shifted, the shifted words are written back to data column 1002 (e.g., column 502). FIG. 11 illustrates how the words are written to (3N−1) column 1102 (e.g., column 1002) in accordance with one embodiment of the invention. Shifted sub-columns $R_A$ and $R_B$ have different word locations corresponding to the word locations in data column 1102. For example, the first word location (e.g., A[1]) in sub-column $R_A$ can correspond to the first word location in column 1102, etc. On the other hand, the first word location (e.g., B[8]) in sub-column $R_B$ can correspond to the eighth word location (e.g., if B is sixteen bits deep) in column 1102. For a rotational barrel shifter, a word location in sub-column $R_B$ below a corresponding last word location in column 1002 (e.g., B[24], B[25]) can correspond to the top word locations in column 1102 (e.g., B'[1], B'[2]). The corresponding word locations can vary depending on the number and group of words that form sub-column B.

For the top N words 1104 in column 1102, a multiplexer 1108, or any other suitable device, can be used to select the words to send to column 1102. Each multiplexer 1108 can have a control signal coupled to multiplexer 1108 to select which input to send to the output. A first input to multiplexer 1108 can be data (e.g., from column 402) to be barrel-shifted in a next cycle. A second input to multiplexer 1108 can be data from a corresponding word location from sub-column $R_A$ (e.g., words A[1]-A[8]). A third input to multiplexer 1108 can be data from a corresponding word location from sub-column $R_B$ (e.g., words B[1]-B[8]). For a rotational barrel shifter, the third input to multiplexer 1108 can be data below a last corresponding word location from sub-column $R_B$ (e.g., words B'[1]-B'[81]).

For the remaining (2N−1) words locations 1106 in column 1102, a multiplexer 1110 can be used to select the words to send to column 1102. Each multiplexer 1110 can have a control signal coupled to multiplexer 1110 to select which input to send to the output. A first input to multiplexer 1110 can be data from a corresponding word location from sub-column $R_A$ (e.g., words A[9]-A[23]). A second input to multiplexer 1110 can be data from a corresponding word location from sub-column $R_B$ (e.g., words B[9]-B[23]). Once the data is written to column 1102, data can be transferred to a buffer column 602 when an end-of-packet is detected in a predetermined group of 2N word locations in column 1102 or when the predetermined group of 2N word locations is full.

Figure 12:
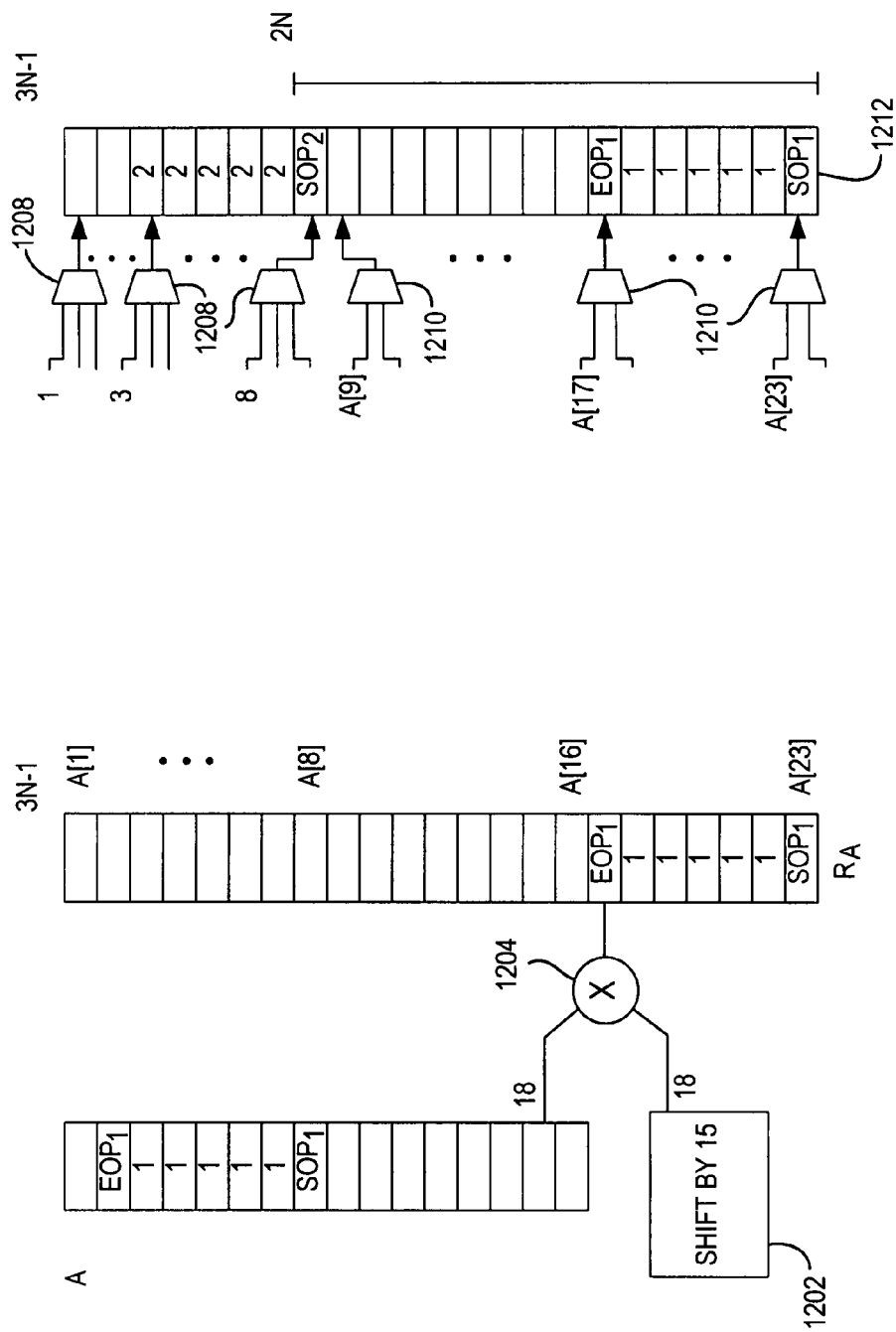
FIGS. 12-13B illustrate an implementation of a uni-directional barrel shifter on the data in FIG. 5 in accordance with one embodiment of the invention.

Two examples are provided illustrating the use of multipliers to barrel-shift data in accordance with one embodiment of the invention. FIG. 12 illustrates in more detail the process of barrel-shifting data in column 502 from clock cycle 3 to 4. Valid data (e.g., packet 1) is present in column 502 only in the upper portion, so only one group of multipliers is needed. As described in connection with FIGS. 7-9, sub-column A can be sliced into bit columns, where each bit column is multiplied by the same shift-by-15 operand 1202 using an 18×18 multiplier 1204. The resulting shifted bit columns can be combined to form shifted sub-column $R_A$ (which include words A[1]-A[23]). Packet 1 is in word locations A[17]-A[23] of sub-column $R_A$.

Multiplexers 1208 and 1210 can be used to select the word to send to column 1212 (e.g., data column 502 in cycle 4). For the top N word locations of column 1212, multiplexers 1208 can select data that has been sent through the crossbar (e.g., data from column 402 in cycle 3). For the remaining (2N−1) word locations of column 1212, multiplexers 1210 can select data from corresponding word locations in sub-column $R_A$.

Figure 13A:
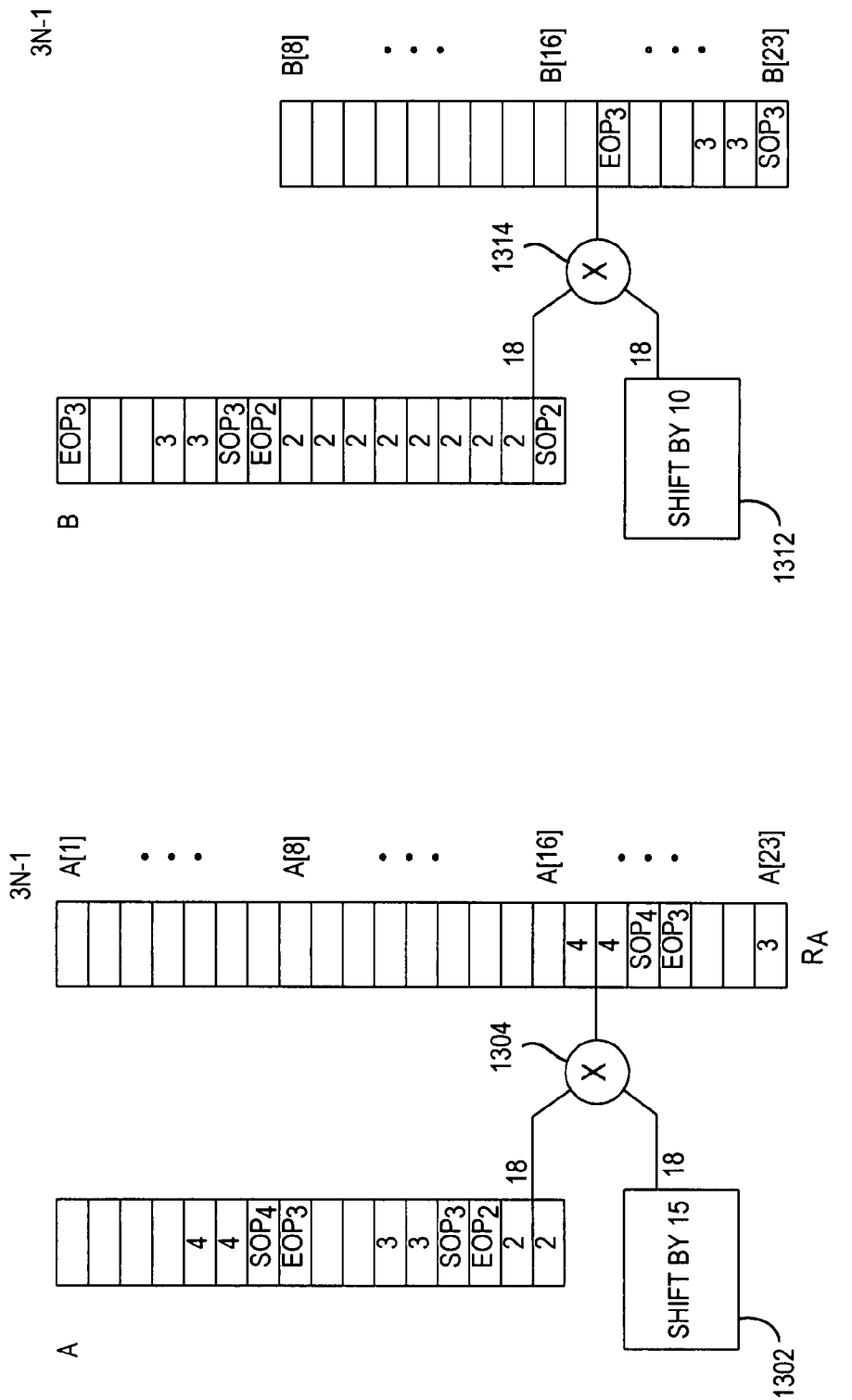
Figure 13B:
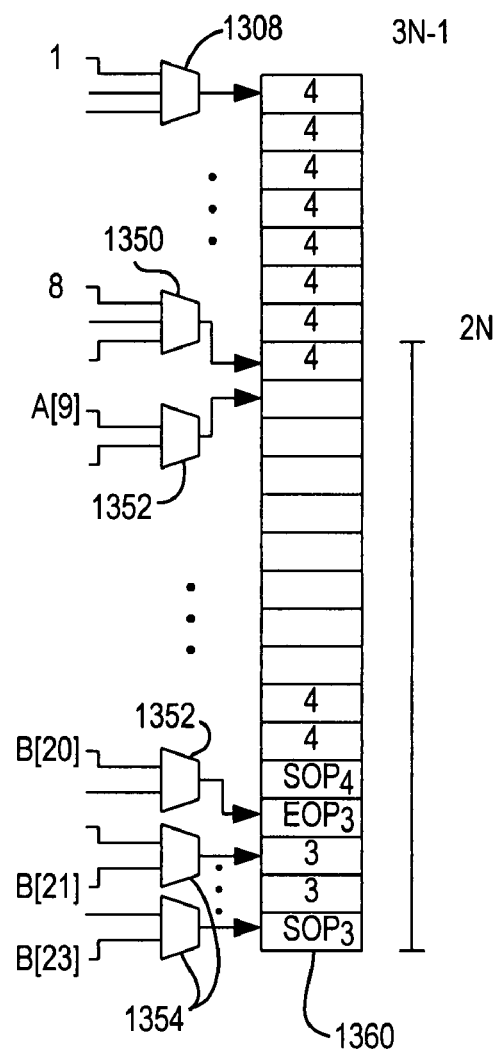

FIGS. 13A-B illustrate in more detail the process of barrel-shifting data in column 502 from cycle 6 to 7. Sub-column B, which can include the lower sixteen words in column 502, can be sliced into bit columns, where each bit column is multiplied by a same shift-by-ten operand 1312 using an 18×18 multiplier 1314. The resulting bit columns are combined to form sub-column $R_B$. The corresponding word locations to column 502 can be the bottom word locations (e.g., labeled B[8]-B[23]). Sub-column A, which can include the upper sixteen words in column 502, can be sliced into bit columns, where each bit column is multiplied by a same shift-by-twelve operand 1302 using an 18×18 multiplier 1304. The resulting bit columns are combined to form column $R_A$. The corresponding word locations to column 502 can be the top (3N−1) word locations (e.g., labeled A[1]-A[23]).

As shown in FIG. 13B, for each word location in column 1360 (e.g., column 502), multiplexers 1350, 1352 and 1354 can be used to select the word to send to column 1360. For the top N word locations, multiplexers 1350 can select the data from column 402 in cycle 6 (e.g., words 1-8). For the next eleven word locations (e.g., words 9-20), multiplexers 1352 can select data from the corresponding word locations in sub-column $R_A$ (e.g., words A[9]-A[20]). For the bottom three word locations (e.g., words 21-23), multiplexers 1354 can select data from the corresponding word locations in sub-column $R_B$ (e.g., words B[2]-B[23]).

Figure 14A:
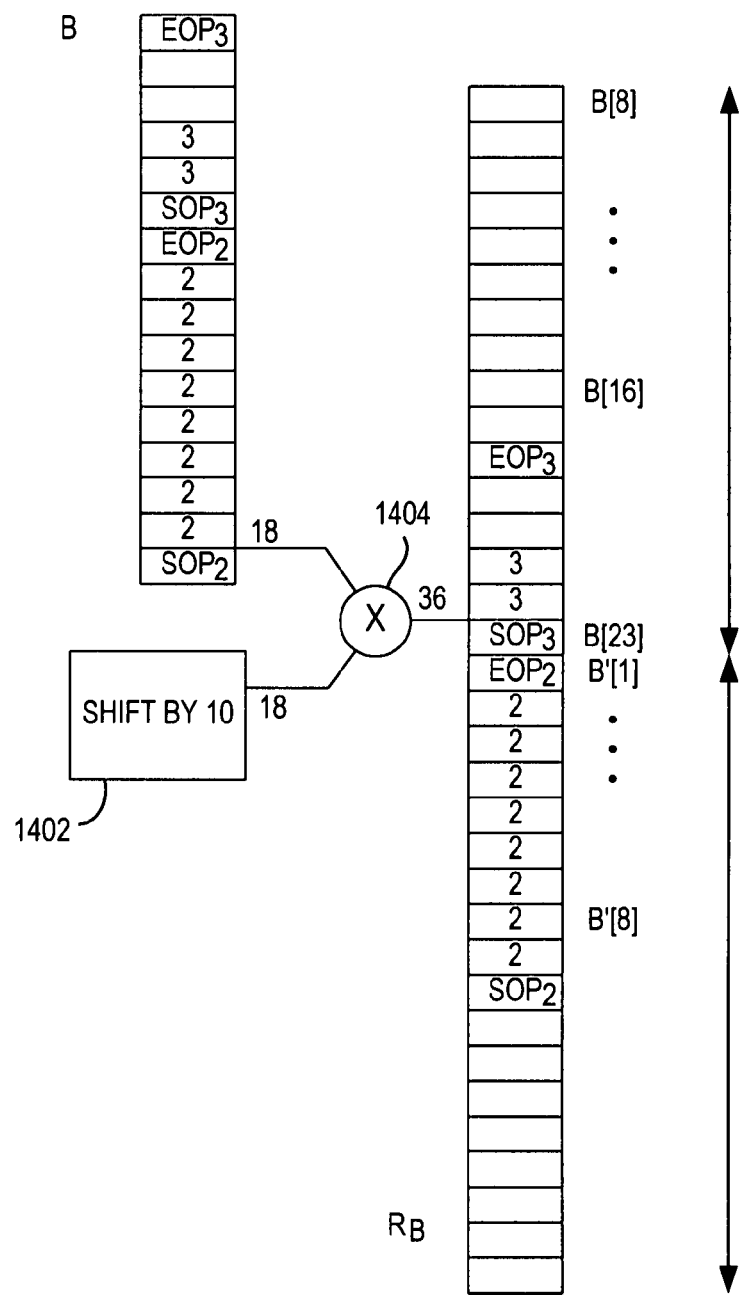
FIGS. 14A-B illustrate an implementation of a rotational barrel shifter on the data in FIG. 5 in accordance with one embodiment of the invention.
Figure 14B:
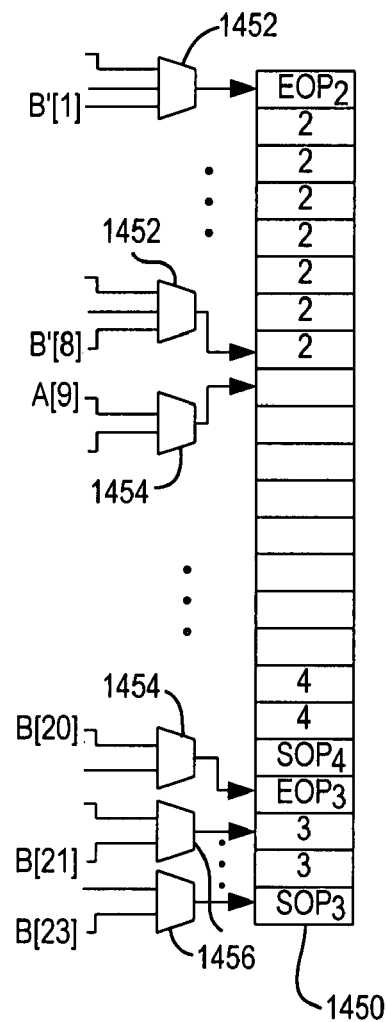

FIGS. 14A-B illustrate one implementation of a rotational barrel shifter on a data column. For example, the lower sixteen words in data column 502 in cycle 6 can form sub-column B. Sub-column B can be sliced into bit columns, with each bit column multiplied by a same shift-by-ten operand 1402 using an 18×18 multiplier 1404. The resulting bit columns are combined to form sub-column $R_B$. In a rotational barrel shifter, the next word location in sub-column $R_B$ after the last corresponding word location (e.g., B[23]) in column 502 can be a first word location (e.g., labeled B'[1]) in column 502, with the remaining words corresponding to word locations at the top of column 502 (e.g., B'[2], B'[3], . . . ). In FIG. 14B, multiplexers 1452 can select data from column $R_B$ (e.g., B'[1]-B'[8]) for a top N word locations in a data column 1450 (e.g., column 502). The rest of column 1450 can be written by multiplexers 1454 and 1456 using the approach described in connection with FIGS. 13A-B, or any other suitable approach.

The invention has several advantages over the previous implementations of a crossbar and barrel shifter in an interface receiver. Implementing the crossbar and barrel shifters using MAC blocks rather than logic elements reduces the number of logic elements by over one-half. For a word-wide data column, thirty-two 18×18 multipliers are needed. Each of the sixteen bit columns uses two multipliers: an upper and a lower multiplier. Each MAC block typically includes four 18×18 multipliers. To implement the barrel shifter using 18×18 multipliers, eight MAC blocks are needed.

Figure 15A:
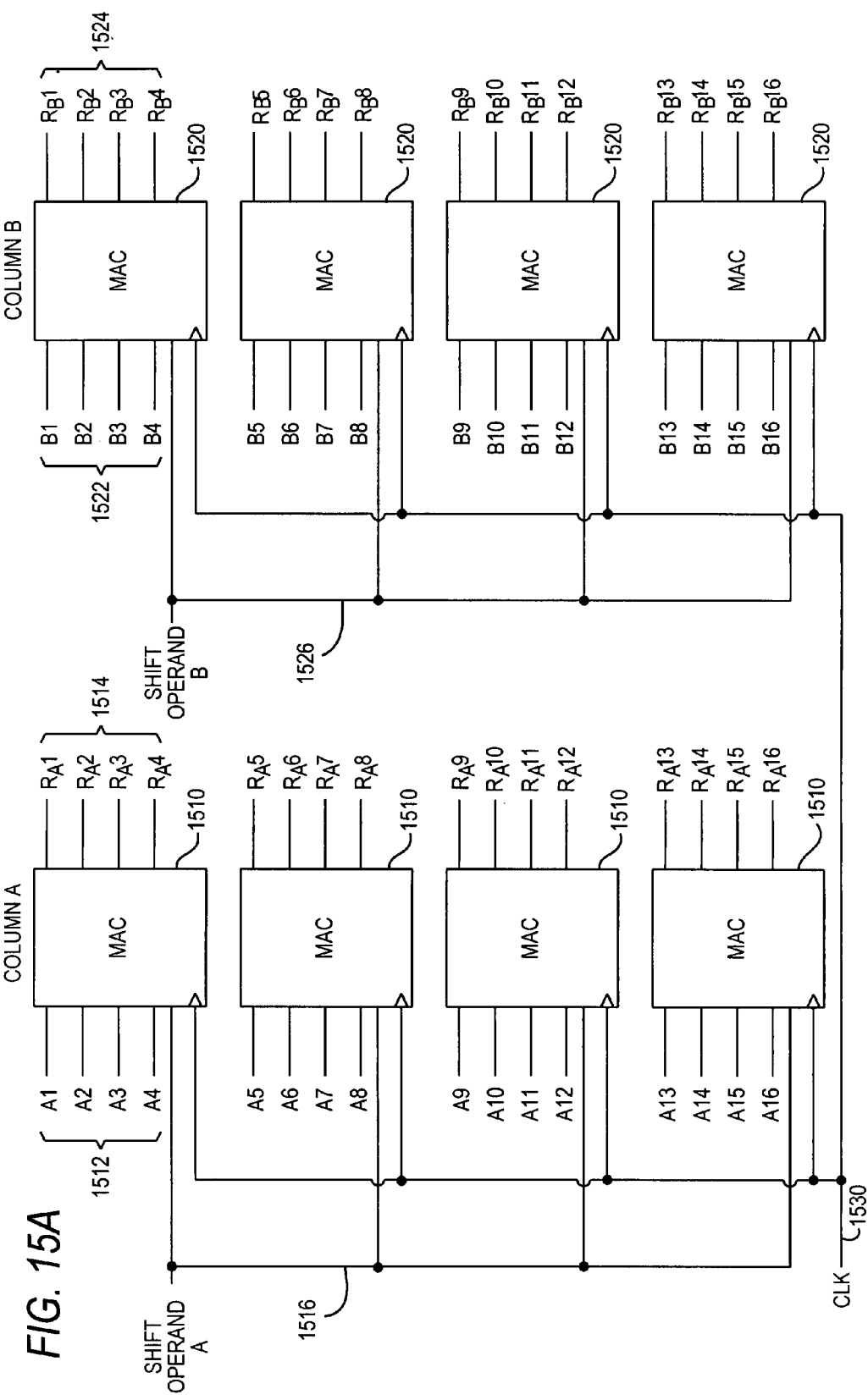
FIGS. 15A-B illustrate barrel shifters using MAC blocks in accordance with another embodiment of the invention.

FIG. 15A illustrates the use of MAC blocks in accordance with one embodiment of the invention. For sub-column A, four MAC blocks 1510 can be used, with four bit columns 1512 (e.g., A1-A4, A5-A8, A9-A12, and A13-A16) as input to each MAC block 1510. A first shift operand 1516 can also be input to each MAC block 1510. Each MAC block 1510 can produce four shifted bit columns 1514 (e.g., $R_A1$-$R_A4$, $R_A5$-$R_A8$, $R_A9$-$R_A12$, and $R_A13$"-$R_A16$), with each shifted bit column corresponding to an input column. For sub-column B, four MAC blocks 1520 can be used, with four bit columns 1522 (e.g., B1-B4, B5-B8, B9-B12, and B13-B16) as input to each MAC block 1520. A second shift operand 1526 can also be input to each MAC block 1520. Each MAC block 1520 can produce four shifted bit columns 1524 (e.g., $R_B1$-$R_B4$, $R_B5$-$R_B8$, $R_B9$-$R_B12$, and $R_B13$-$R_B16$), with each shifted bit column corresponding to an input column. MAC blocks 1510 and 1520 can be controlled by a clock 1530.

Figure 15B:
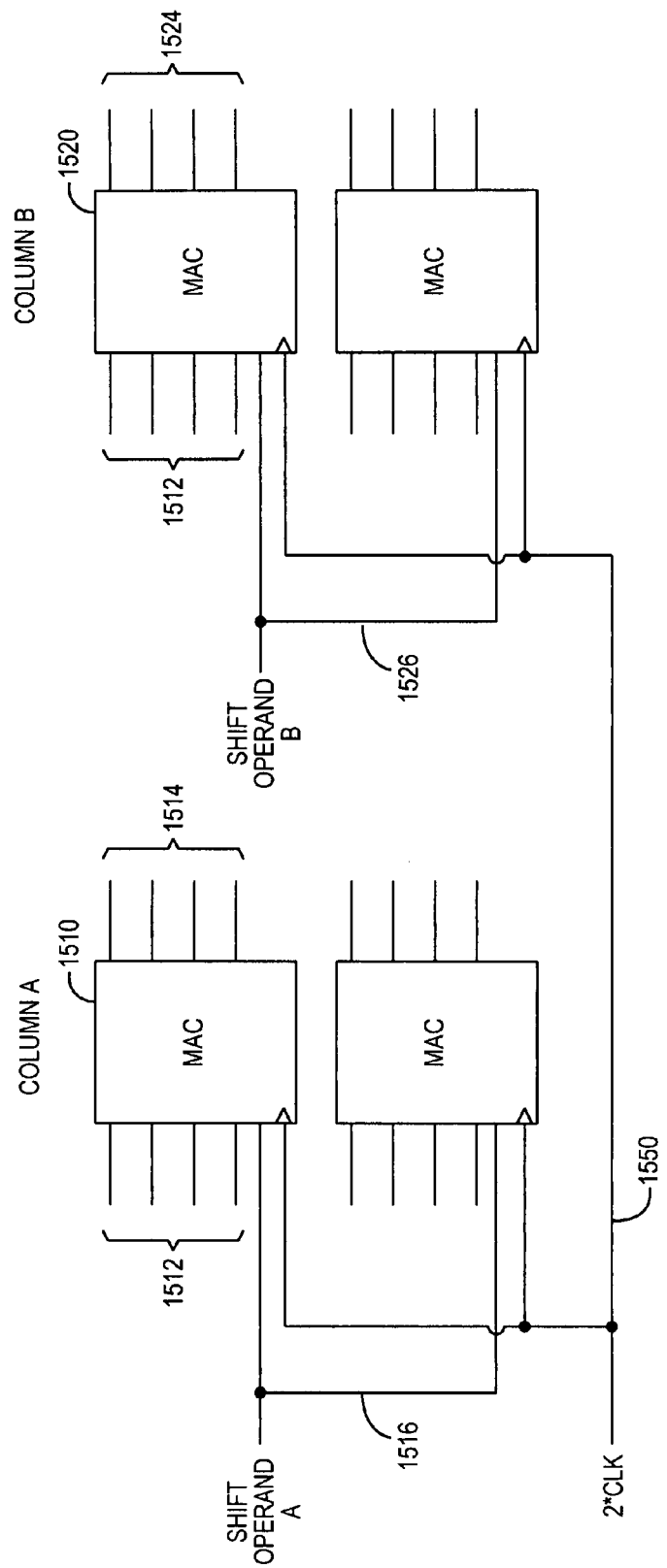

The number of MAC blocks needed can be reduced by half by using time domain multiplexing (TDM). In TDM, a faster clock can drive MAC blocks 1510 and 1520 (e.g., at twice the frequency of CLK 1530). Using TDM, the bit columns can be divided into two groups so that the multiplication operations occur over two clock cycles rather than one. The overall time to produce all the shifted bit columns 1514 and 1524 does not change. FIG. 15B illustrates the use of MAC blocks with TDM. Two MAC blocks 1510 can be used to shift sub-column A and two MAC blocks 1520 can be used to shift sub-column B. MAC blocks 1510 and 1520 can be driven by a clock 1550, which can be twice the frequency of CLK 1530 (e.g., the clock used to for MAC blocks without TDM). The use of MAC blocks significantly reduces the number of logic elements, and thus also reduces the area and cost, which lead to a significant improvement in performance.

Figure 16:
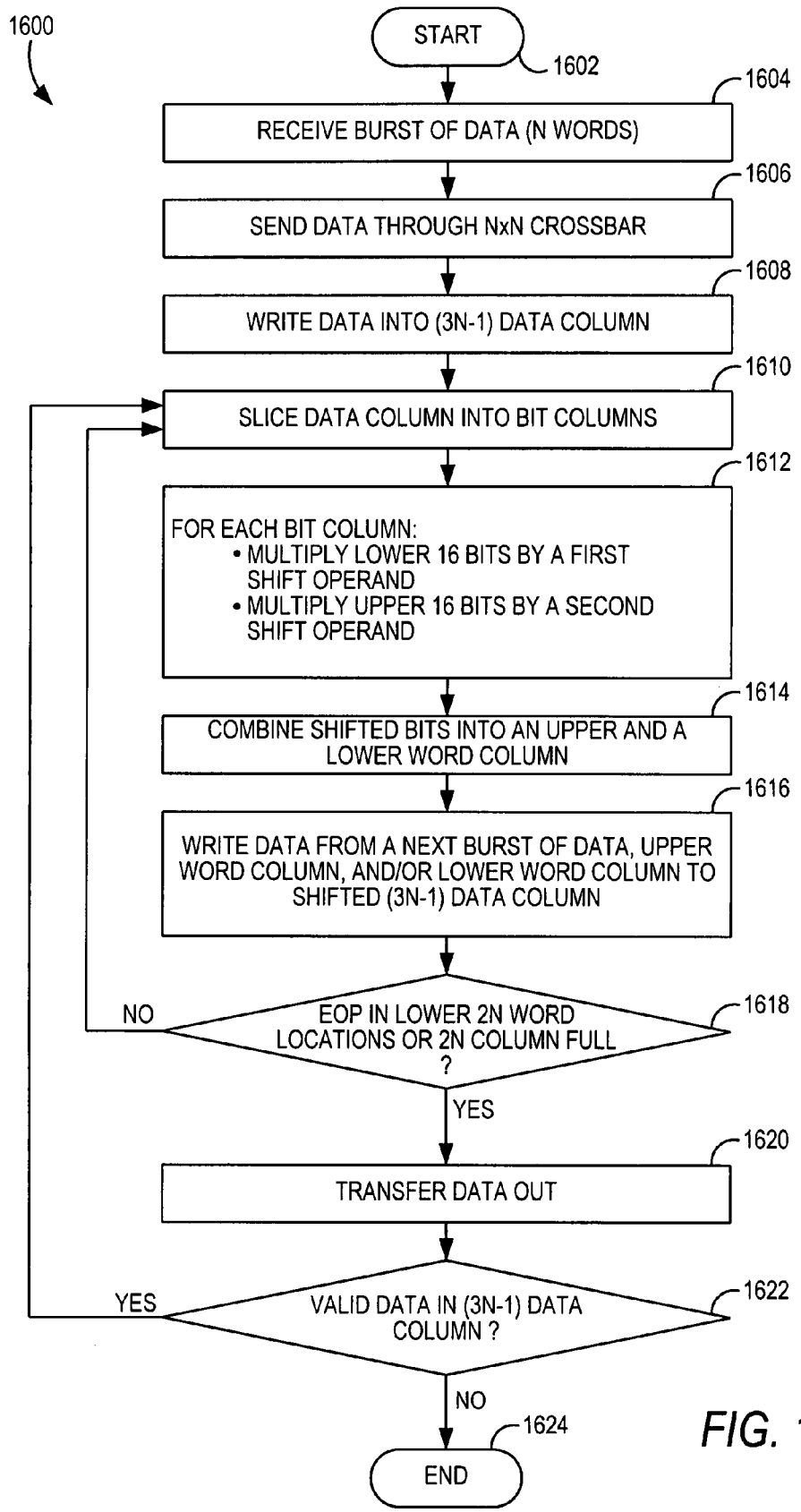
FIG. 16 is a flow diagram of illustrative steps involved in implementing a crossbar and barrel shifter in accordance with one embodiment of the invention.

FIG. 16 is a flow diagram illustrating a process 1600 for implementing a crossbar and barrel shifter in accordance with one embodiment of the invention. Process 1600 begins at step 1602 with an I/O standard sending a burst of data each clock cycle. At step 1604, an interface receiver receives a burst of data containing a number of words predetermined by the given I/O standard. The words are arranged in a data column and are sent through an N×N crossbar at step 1606 where the control words are separated from the valid words and are moved to the top of the data column, and the valid words can be reordered in any suitable way. At step 1608, the reordered valid words are written into a top N word locations in a (3N−1) data column. Any remaining word locations can also contain data from a prior burst of data. At step 1610, the (3N−1) data column is sliced into bit columns. Next at step 1612, for each bit column, the lower sixteen bits are multiplied by a first shift operand in 18×18 multipliers. Also for each bit column, the upper sixteen bits are multiplied by a second shift operand in 18×18 multipliers. The results from each multiply operation on the upper bits are combined into an upper word column and the results from each multiplication operation on the lower bits are combined into a lower word column at step 1614.

Process 1600 then moves to step 1616 where the barrel-shifted data column is written. For each of the top N word locations, a multiplexer can select from a next burst of data that has been sent through a crossbar (e.g., step 1608), a corresponding word location in the upper word column, or a corresponding word location in the lower word column. For each of the remaining word locations, a multiplexer can select from a corresponding word location in the upper word column or a corresponding word location in the lower column. Once the data has been barrel-shifted using multipliers and multiplexers, process 1600 determines whether the data is to be transferred out of the shifted data column at step 1618. If data is not to be transferred out, process 1600 returns to step 1610. If an end-of-packet is detected within a bottom 2N word locations or the bottom 2N word locations are filled with valid words, the data is transferred out at step 1620. When an EOP is detected, the rest of that packet is transferred out. When the 2N word locations are filled, data in the 2N word locations are transferred out. Next, at step 1622, process 1600 determines whether the shifted data column still contains valid data (e.g., data from a prior burst of data that was not shifted out or data from a new burst of data). If there is no longer valid data in the shifted data column, process 1600 ends at step 1624. If there is still valid data, process 1600 returns to step 1610. While data is being shifted, process 1600 continues to process steps 1604 and 1606 at each clock cycle.

Figure 17:
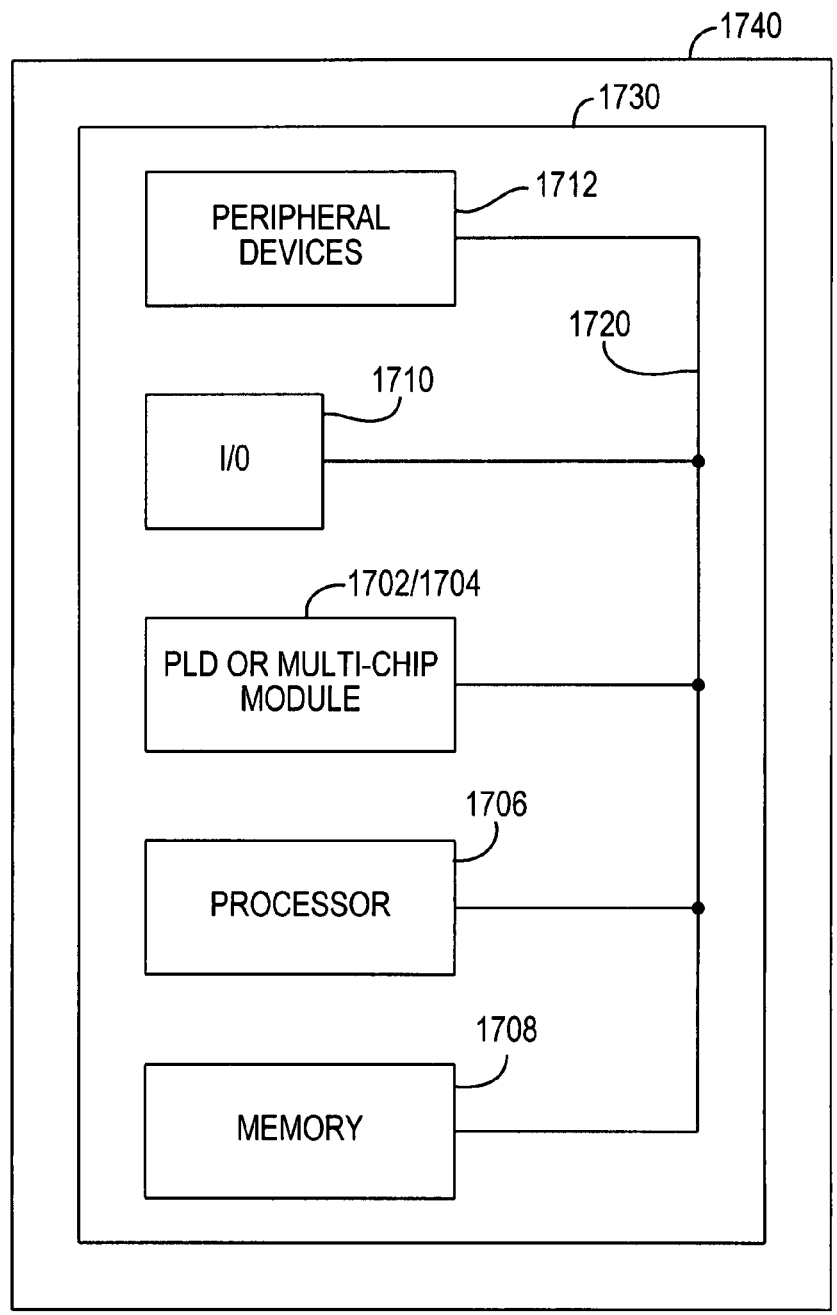
FIG. 17 is a simplified block diagram of an illustrative system employing circuitry in accordance with one embodiment of the invention.

FIG. 17 illustrates a programmable logic device (PLD) 1702 or multi-chip module 1704 which includes embodiments of this invention in a data processing system 1700. Data processing system 1700 can include one or more of the following components: a processor 1706; memory 1708; I/O circuitry 1710; and peripheral devices 1712. These components are coupled together by a system bus or other interconnections 1720 and are populated on a circuit board 1730 which is contained in an end-user system 1740.

System 1700 can be used in a wide variety of applications, such as computer networking, data networking, instrumentation, video processing, digital signal processing, or any other application where the advantage of using programmable or reprogrammable logic is desirable. PLD/module 1702/1704 can be used to perform a variety of different logic functions. For example, PLD/module 1702/1704 can be configured as a processor or controller that works in cooperation with processor 1706. PLD/module 1702/1704 may also be used as an arbiter for arbitrating access to a shared resource in system 1700. In yet another example, PLD/module 1702/1704 can be configured as an interface between processor 1706 and one of the other components in system 1700. It should be noted that system 1700 is only exemplary, and that the true scope and spirit of the invention should be indicated by the following claims.

Various technologies can be used to implement programmable logic resources 1702 or multi-chip modules 1704 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMS, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that performance can be improved in an interface receiver by implementing crossbars and barrel shifters using MAC blocks. One skilled in the art will appreciate that the invention can be practiced by other than the prescribed embodiments, which are presented for purposes of illustration and not of limitation, and the invention is limited only by the claims which follow.

What is claimed is:

1. An apparatus for processing a burst of data comprising:
a crossbar to receive data in a first data format from the burst of data and reorder the data, wherein the burst of data comprises a predetermined number of words comprising at least one of control words and valid words, and the crossbar separates the control words from the valid words in the burst of data; and
at least one multiplier-accumulator block to receive the reordered data, apply a barrel shifter operation to the reordered data, and transfer the shifted data out of the apparatus in a second data format when at least one predetermined condition on the shifted data is met.

2. The apparatus of claim 1 wherein the multiplier-accumulator block accepts as input:
the valid words from the burst of data; and
an operand whose value indicates a number of word locations to shift the valid words.

3. The apparatus of claim 2 wherein the multiplier-accumulator block comprises at least one multiplier that multiplies the valid words by the operand to produce the shifted data.

4. The apparatus of claim 1 wherein the multiplier-accumulator block accepts as input:
data comprising the valid words from the burst of data and valid words from a prior burst of data; and
an operand whose value indicates a number of word locations to shift the data.

5. The apparatus of claim 4 wherein the multiplier-accumulator block comprises a first multiplier that multiplies a first predetermined sub-group of the data by a first operand to produce a first shifted result.

6. The apparatus of claim 5 further comprising a second multiplier that multiplies a second predetermined sub-group of the data by a second operand to produce a second shifted result.

7. The apparatus of claim 6 further comprising at least one multiplexer that selects from at least one of the first shifted result and the second shifted result to produce the shifted data.

8. The apparatus of claim 6 further comprising at least one multiplexer that selects from at least one of reordered data from a next burst of data, the first shifted result, and the second shifted result to produce the shifted data.

9. The apparatus of claim 8 wherein the shifted data is transferred out of the apparatus when predetermined conditions on the shifted data are met.

10. The apparatus of claim 1 wherein the apparatus is an interface receiver.

11. A programmable logic device comprising the apparatus as defined in claim 1, wherein the crossbar is primarily implemented using logic elements.

12. A method for processing a burst of data in an interface receiver comprising:
sending data in a first data format from the burst of data through a crossbar to reorder the data, wherein the burst of data comprises a predetermined number of words comprising at least one of control words and valid words, and wherein sending the data through the crossbar comprises separating the control words from the valid words in the burst of data;
receiving the reordered data and applying a barrel shifter operation to the reordered data using at least one multiplier-accumulator block; and
transferring the shifted data out of the interface receiver in a second data format when at least one predetermined condition on the shifted data is met.

13. The method of claim 12 wherein applying the barrel shifter operation to the reordered data comprises multiplying the valid words from the burst of data by an operand whose value indicates a number of locations to shift the valid words to produce the shifted data.

14. The method of claim 12 wherein applying the barrel shifter operation to the reordered data comprises multiplying the valid words from the burst of data and valid words from a prior burst of data by an operand whose value indicates a number of locations to shift the data.

15. The method of claim 14 further comprising multiplying a first predetermined sub-group of the data by a first operand to produce a first shifted result.

16. The method of claim 15 further comprising multiplying a second predetermined sub-group of the data by a second operand to produce a second shifted result.

17. The method of claim 16 further comprising selecting from at least one of the first shifted result and the second shifted result to produce shifted data.

18. The method of claim 17 further comprising transferring the shifted data out of the interface receiver when predetermined conditions on the shifted data are met.

19. The method of claim 16 further comprising selecting from at least one of reordered data from a next burst of data, the first shifted result, and the second shifted result to produce the shifted data.

20. The method of claim 12 wherein applying the barrel shifter operation to the reordered data further comprises sending data from a next burst of data through the crossbar.

21. The method of claim 12 further comprising implementing the interface receiver on a programmable logic device, wherein the crossbar is primarily implemented using logic elements.

22. A method for processing a burst of data in an interface receiver comprising:
   in a first clock cycle: reordering data in a first data format from the burst of data using a crossbar;
   in a second clock cycle:
      shifting the reordered data from the burst of data by an operand using at least one multiplier-accumulator block, and
      reordering data from a next burst of data; and in a third clock cycle:
      selecting from at least one of the reordered data from the next burst of data and an output of the multiplier-accumulator block; and
      transferring the shifted data out of the interface receiver in a second data format.

23. The method of claim 22 wherein the burst of data comprises a predetermined number of words comprising at least one of control words and valid words.

24. The method of claim 23 wherein reordering the data from the burst of data comprises separating the control words from the valid words.

25. The method of claim 24 wherein shifting the reordered data from the burst of data comprises shifting the valid words in the burst of data.

26. The method of claim 22 wherein shifting the reordered data from the burst of data comprises:
   multiplying a first predetermined sub-group of the reordered data from the burst of data by a first operand whose value indicates a number of word locations to shift the reordered data to produce a first shifted result; and
   multiplying a second predetermined sub-group of the reordered data from the burst of data by a second operand to produce a second shifted result.

27. The method of claim 26 further comprising, in the third clock cycle, selecting from at least one of the reordered data from the next burst of data, the first shifted result, and the second shifted result to produce the shifted data.

28. The method of claim 27 further comprising transferring the shifted data out of the interface receiver when predetermined conditions on the shifted data are met.

* * * * *